United States Patent
Ginat et al.

(10) Patent No.: US 11,272,094 B2
(45) Date of Patent: Mar. 8, 2022

(54) SYSTEM AND METHOD PROVIDING OBJECT-ORIENTED ZOOM IN MULTIMEDIA MESSAGING

(71) Applicant: Endless Technologies Ltd., Ramat Gan (IL)

(72) Inventors: Roi Ginat, Ramat Gan (IL); Liron Hertz, Givataim (IL)

(73) Assignee: ENDLESS TECHNOLOGIES LTD., Ramat Gan (IL)

( * ) Notice: Subject to any disclaimer, the term of this patent is extended or adjusted under 35 U.S.C. 154(b) by 0 days.

(21) Appl. No.: 16/314,623

(22) PCT Filed: Jul. 14, 2017

(86) PCT No.: PCT/IB2017/001026
§ 371 (c)(1),
(2) Date: Dec. 31, 2018

(87) PCT Pub. No.: WO2018/015806
PCT Pub. Date: Jan. 25, 2018

(65) Prior Publication Data
US 2019/0208114 A1    Jul. 4, 2019

Related U.S. Application Data

(60) Provisional application No. 62/363,699, filed on Jul. 18, 2016.

(51) Int. Cl.
*H04N 5/232* (2006.01)
*G06K 9/32* (2006.01)
(Continued)

(52) U.S. Cl.
CPC ........... *H04N 5/23219* (2013.01); *G06K 9/00* (2013.01); *G06K 9/00671* (2013.01);
(Continued)

(58) Field of Classification Search
CPC .. H04N 5/23219; H04N 19/00; H04N 19/102; H04N 19/167; H04N 19/17;
(Continued)

(56) References Cited

U.S. PATENT DOCUMENTS

2002/0021353 A1    2/2002  Denies
2006/0215752 A1    9/2006  Lee et al.
(Continued)

OTHER PUBLICATIONS

International Search Report dated Dec. 11, 2017, in International Application No. PCT/IB2017/001026; 6 pages.

*Primary Examiner* — Lin Ye
*Assistant Examiner* — Chan T Nguyen
(74) *Attorney, Agent, or Firm* — Finnegan, Henderson, Farabow, Garrett & Dunner, LLP

(57) ABSTRACT

Providing object-oriented-zoom by identifying, in a transmitter, a region-of-interest in a captured video part, communicating to a receiver the video stream, and an identification of the region-of-interest, marking, on a display of the receiver, the region-of-interest over the captured video stream on a screen display, receiving from a selection of the displayed region-of-interest forming a selected object, communicating the selection to the transmitter, dividing the video stream, in the transmitter, into a first part including the selected object, and a second part including at least a part of the captured video stream less the first part, communicating the first and second parts to the receiver, displaying the first and second parts simultaneously, where the first part is displayed in a substantially constant location of a screen display of the receiver, and where the second part is displayed around the first part to fill the screen display of the receiver.

17 Claims, 9 Drawing Sheets

(51) Int. Cl.
*H04N 19/00* (2014.01)
*G06K 9/22* (2006.01)
*G06K 9/00* (2006.01)
*H04N 19/102* (2014.01)
*G06K 9/20* (2006.01)
*G06K 9/36* (2006.01)
*G06K 9/46* (2006.01)
*H04N 19/167* (2014.01)
*H04N 19/17* (2014.01)
*H04N 5/262* (2006.01)
*H04N 21/2343* (2011.01)
*H04N 21/24* (2011.01)

(52) U.S. Cl.
CPC .......... *G06K 9/00791* (2013.01); *G06K 9/20* (2013.01); *G06K 9/228* (2013.01); *G06K 9/3233* (2013.01); *G06K 9/36* (2013.01); *G06K 9/46* (2013.01); *H04N 5/23296* (2013.01); *H04N 5/2628* (2013.01); *H04N 19/00* (2013.01); *H04N 19/102* (2014.11); *H04N 19/167* (2014.11); *H04N 19/17* (2014.11); *H04N 21/234363* (2013.01); *H04N 21/2402* (2013.01)

(58) Field of Classification Search
CPC ............ H04N 5/23296; H04N 5/2628; H04N 21/234363; H04N 21/2402; H04N 21/6587; H04N 21/44222; H04N 21/2662; H04N 21/234345; H04N 21/4728; G06K 9/228; G06K 9/00791; G06K 9/00671; G06K 9/20; G06K 9/36; G06K 9/00; G06K 9/46; G06K 9/3233
USPC ...................................................... 348/222.1
See application file for complete search history.

(56) References Cited

U.S. PATENT DOCUMENTS

| | | |
|---|---|---|
| 2007/0086669 A1 | 4/2007 | Berger et al. |
| 2007/0097261 A1 | 5/2007 | Smith et al. |
| 2007/0121011 A1 | 5/2007 | Relan et al. |
| 2009/0251594 A1* | 10/2009 | Hua ................ H04N 7/0122 348/441 |
| 2009/0300692 A1 | 12/2009 | Mavlankar et al. |
| 2009/0320081 A1 | 12/2009 | Chui et al. |
| 2011/0299832 A1 | 12/2011 | Butcher |
| 2012/0062732 A1* | 3/2012 | Marman ......... G08B 13/19682 348/142 |
| 2013/0083153 A1 | 4/2013 | Lindbergh |
| 2013/0089153 A1* | 4/2013 | Wang ................... H04N 19/46 375/240.25 |
| 2013/0259114 A1 | 10/2013 | Carlsson et al. |
| 2014/0059166 A1* | 2/2014 | Mann ................ H04N 21/4728 709/217 |
| 2015/0032901 A1 | 1/2015 | Wang et al. |

* cited by examiner

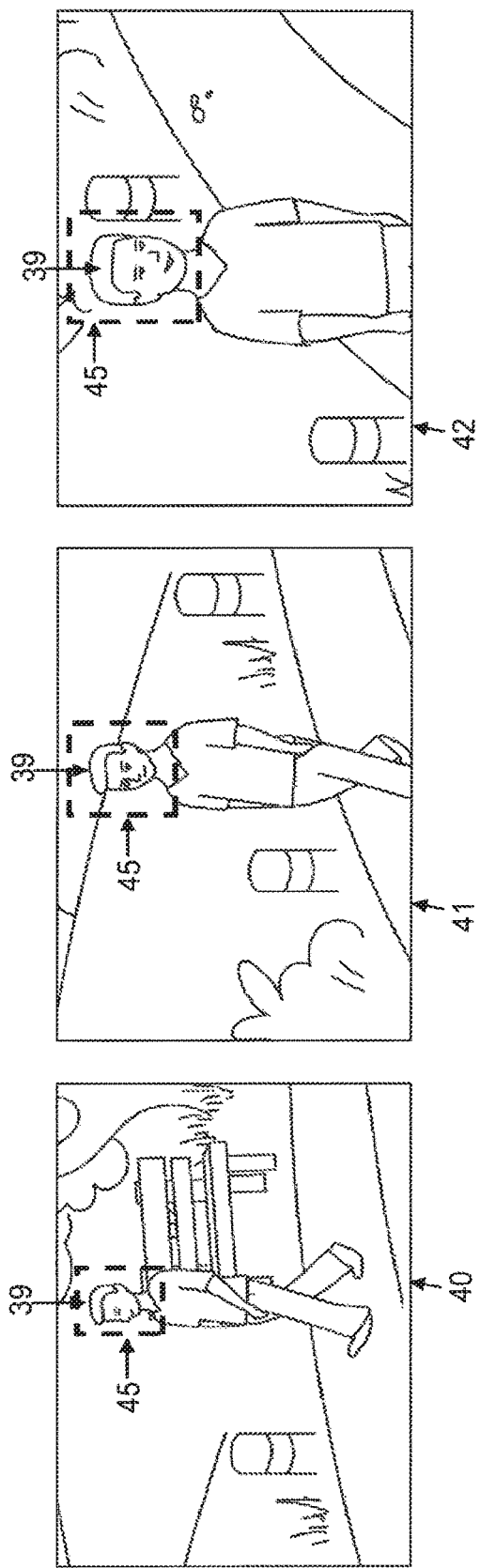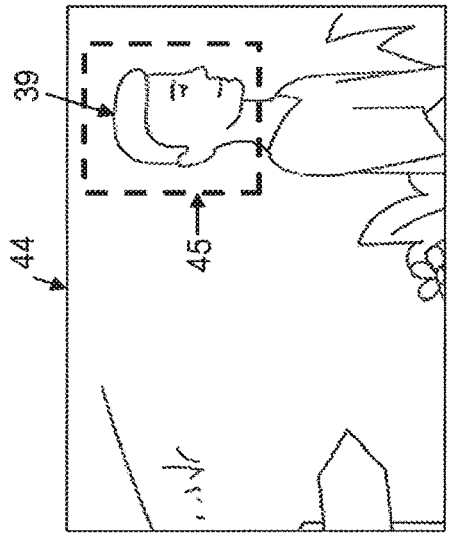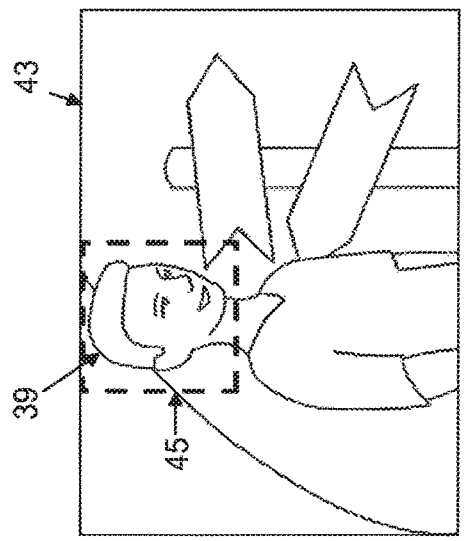
Fig. 5

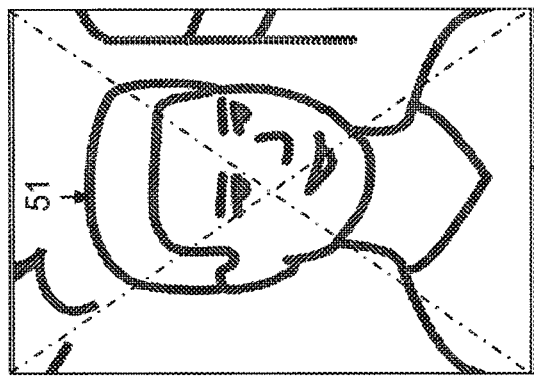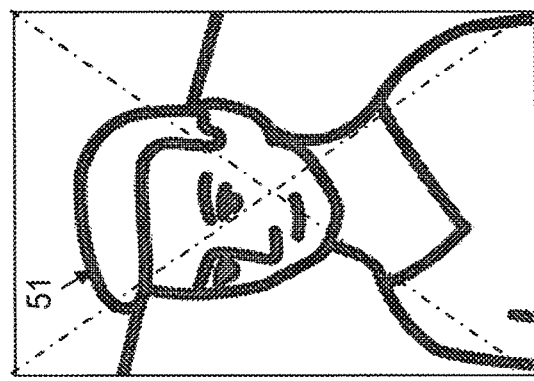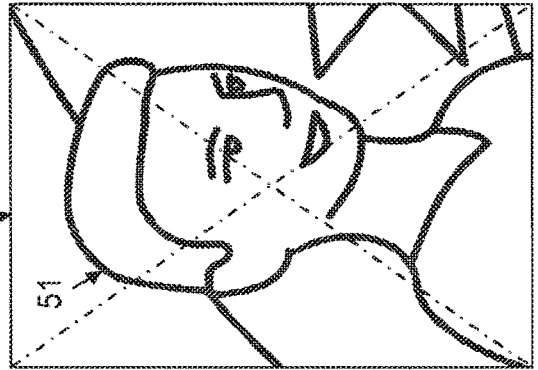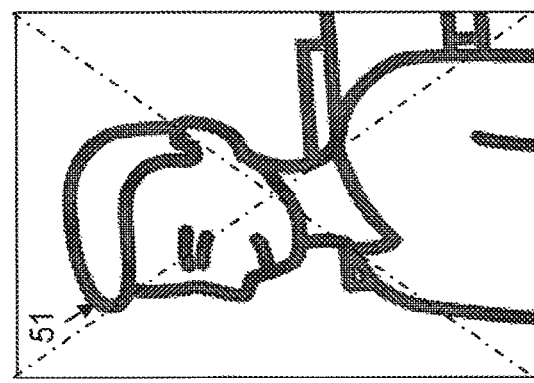
Fig. 6

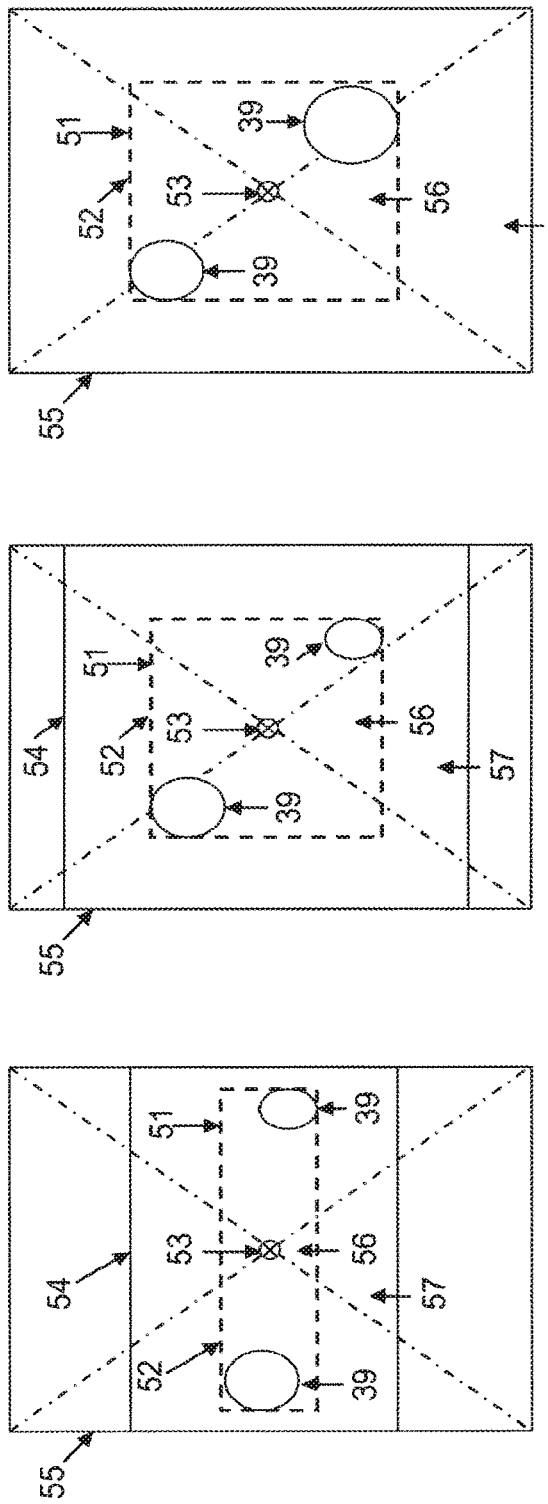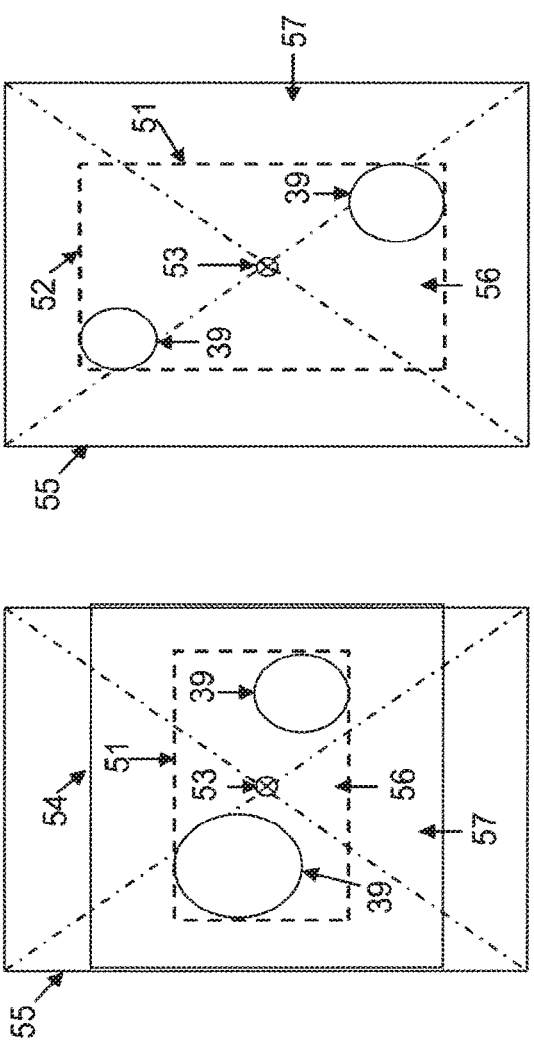
Fig. 7

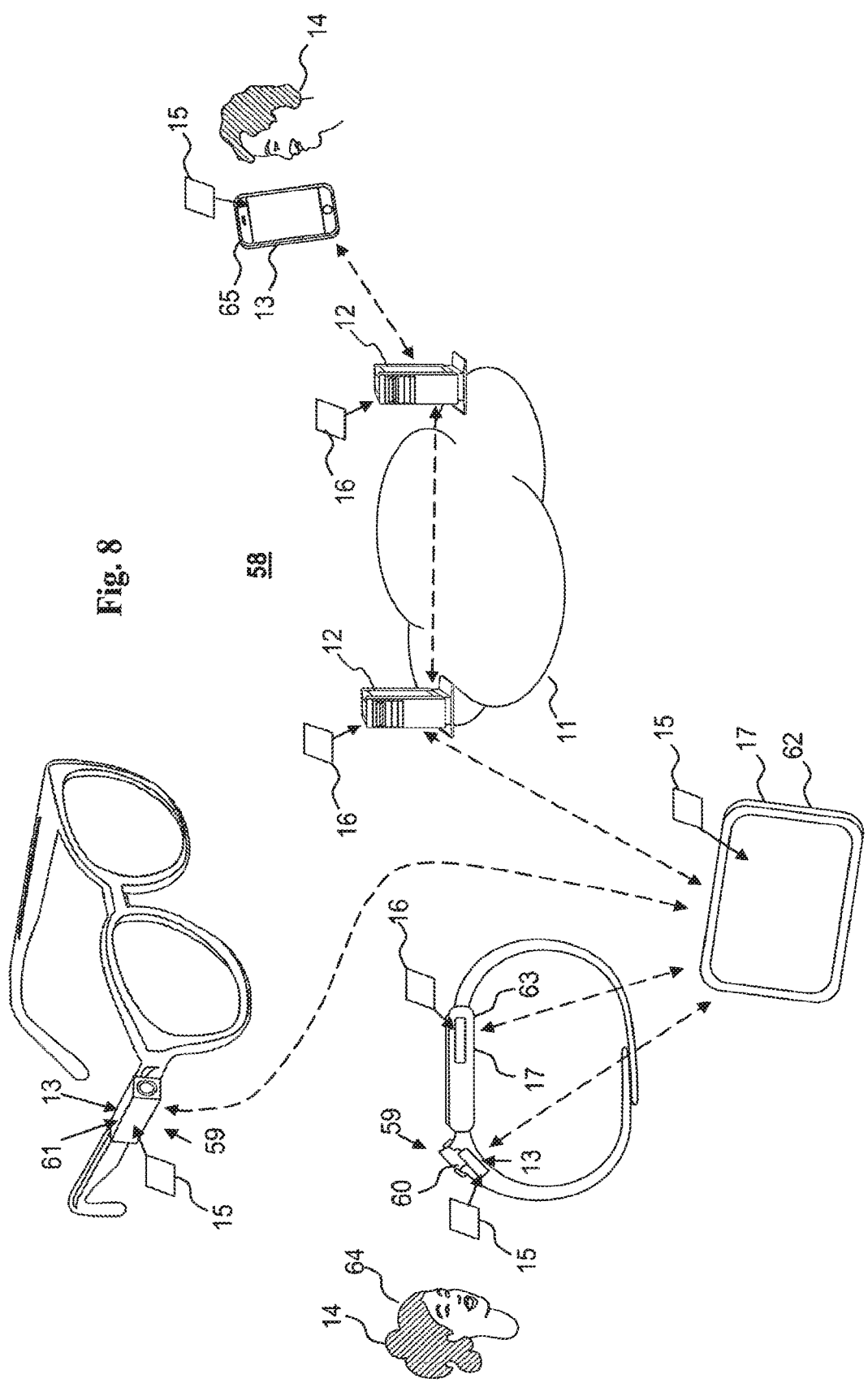

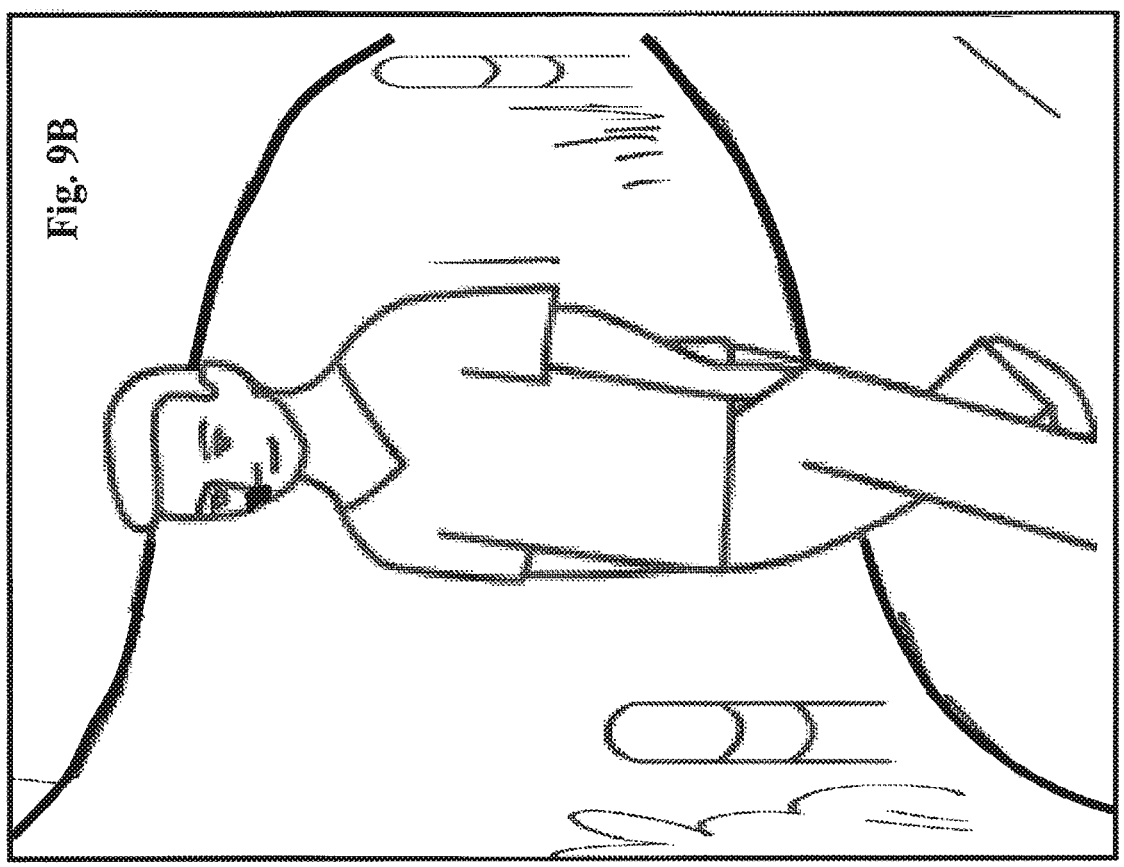
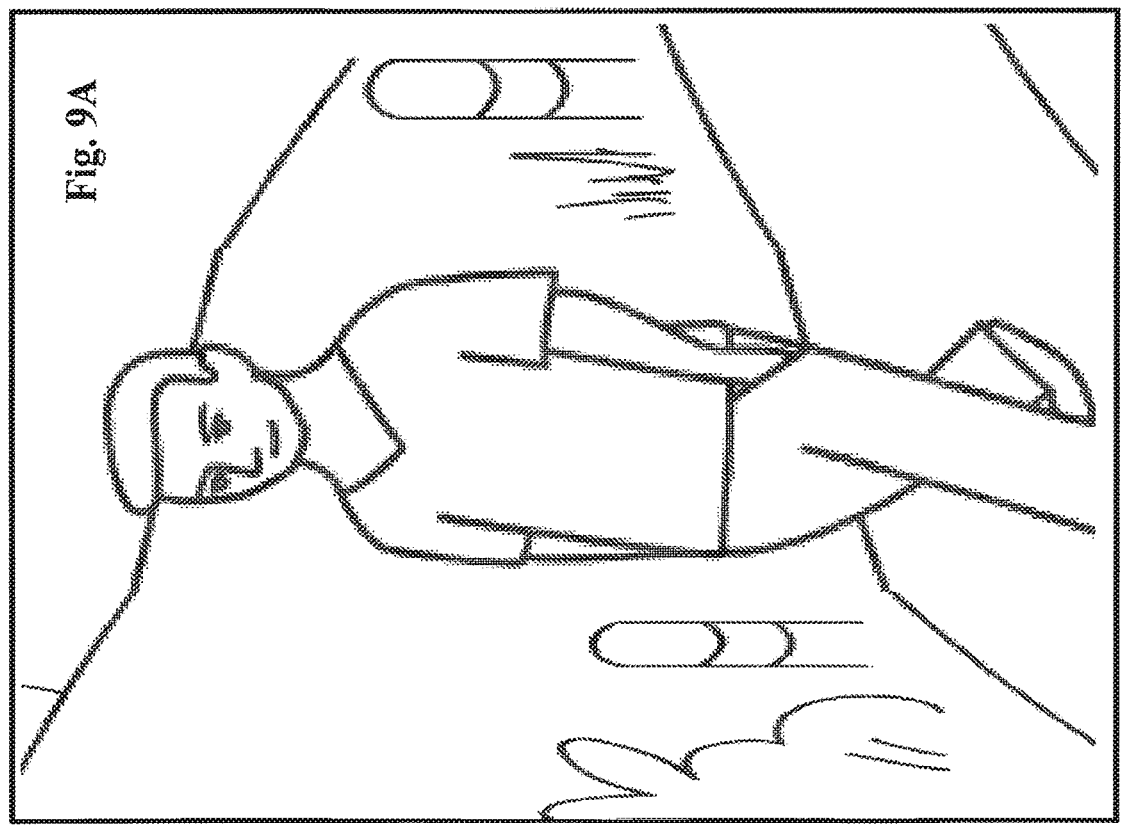

SYSTEM AND METHOD PROVIDING OBJECT-ORIENTED ZOOM IN MULTIMEDIA MESSAGING

PRIORITY

This application is a U.S. National Stage Filing under 35 U.S.C. § 371 of International application no. PCT/IB2017/001026 filed on Jul. 14, 2017, which claims priority to U.S. Provisional Application No. 62/363,699, filed Jul. 18, 2016, and titled "System and Method Providing Object-Oriented Zoom in Multimedia Messaging," the disclosures of which are hereby incorporated by reference.

FIELD

The methods and apparatuses disclosed herein are related to the field of video communication and, more particularly, but not exclusively, to systems and methods for stabilizing a display of an object in a video message.

Communicating video over a communication network is known, and used extensively with smartphone cameras and wearable cameras. Video streams captured by small handheld cameras, and particularly wearable cameras, tend to be unstable, in the sense that, when displayed, the object of interest tends to move rapidly throughout the screen display. Such object instability is difficult to view and causes discomfort to the viewer. Further, image instability loads the communication bandwidth, which is usually a scarce resource.

There is thus a widely recognized need for, and it would be highly advantageous to have, a system and method for communicating video streams that overcomes the above limitations.

SUMMARY

In the following description certain aspects and embodiments of the present disclosure will become evident. It should be understood that the disclosure, in its broadest sense, could be practiced without having one or more features of these aspects and embodiments. It should also be understood that these aspects and embodiments are examples only.

The disclosed embodiments include a computer-implemented method for object-oriented-zoom. The method may comprise receiving, from a transmitter, a captured video stream and an identification of at least one region-of-interest in said captured video stream, marking said at least one region-of-interest on a display of said captured video stream on a screen display, receiving, from a user, a selection of said marked region-of-interest, wherein said selection forms a selected object, communicating said selection to said transmitter, receiving, from said transmitter, a divided version of said video stream, said divided version of said video stream including a first part comprising said selected object, and a second part comprising at least a part of said video stream less said first part, and displaying at least a portion of said first part and said second part simultaneously.

In some embodiments, said first part comprises a first video stream and said second part comprises a second video stream.

Further embodiments comprise receiving an interleaved multimedia stream comprising said first video stream comprising a plurality of first communication elements, and said second video stream comprising a plurality of second communication elements, wherein said interleaved multimedia stream comprises an interleaved sequence of said first and second communication elements, and wherein at least one first communication element is associated with at least one second communication element, at least one of temporally and spatially.

In additional embodiments, said interleaved multimedia stream additionally comprises at least one communication element providing said association between said at least one first communication element and said at least one second communication element.

Some embodiments also comprise receiving a size selection of said selected object, and displaying said selected object while performing at least one of preserving said selected size of said selected object, and preserving at least one of a center location and a location of center of said selected object on said screen display.

According to further embodiments, said selected object comprises a plurality of regions-of-interest, and at least one of wherein said step of preserving said selected size of said selected object comprises preserving said size between said plurality of regions-of-interest, and wherein said step of preserving at least one of said center location and said location of center of said selected object comprises preserving said location of center of said plurality of regions-of-interest.

Further embodiments comprise at least one of cropping said first part to fit a display screen, shrinking said first part to fit said display screen, and converting said first part into non-linear mode to fit said display screen.

In some embodiments, said first part comprises relatively high-quality video and said second part comprises relatively low-quality video.

In additional embodiments, said low-quality of said second part is adapted to at least one of an area size of said screen display allocated to display said second part, a display parameter of said screen display allocated to display said second part, and a communication parameter of a network communicatively coupling said transmitter and a communication device comprising said screen display.

In accordance with some embodiments, said high-quality and low-quality are based on at least one of bandwidth allocated to said first part, bandwidth allocated to said second part, compression allocated to said second part, compression allocated to said first part, lossy compression allocated to said second part, loss-less compression allocated to said first part, resolution allocated to said first part, resolution allocated to said second part, color depth allocated to said first part, and color depth allocated to said second part.

Some embodiments further comprise at least one of converting said second part into a non-linear mode, and converting said first part into a linear mode.

Additional embodiments comprise creating said first part and said second part by at least one of creating at least one of said parts by an imaging device capturing said video stream, creating at least one of said parts by said transmitter, creating at least one of said parts by a recipient communication terminal, creating at least one of said parts by a network server, and creating at least one of said parts in an intermediary location in a communication network connecting said transmitter and said recipient communication terminal.

Disclosed embodiments also include a system for communicating object-oriented-zoom. The system may comprise a transmitter comprising a processor executing software program instructions to perform operations comprising identifying at least one region-of-interest in a captured video stream, communicating to a receiver said video stream and an identification of said region-of-interest, receiving, from the receiver, a selection of, said region-of-interest, wherein said selection forms a selected object, dividing said video stream into at least one first part comprising said selected object, and a second part comprising at least a part of said video stream less said first part, and communicating said first part and said second part to said receiver for simultaneous display on said receiver, and said receiver comprising a processor executing software program instructions to perform operations comprising, marking said region-of-interest on a display of said video stream on a screen display, receiving, from a user, a selection of said region-of-interest, communicating said selection to said transmitter, receiving from said transmitter said first part and said second part, and displaying at least a portion of said first part and said second part simultaneously.

A further embodiment includes a transmitter of object-oriented-zoom. The transmitter may comprise a processor executing software program instructions to perform operations comprising identifying at least one region-of-interest in a captured video stream, communicating to a receiver said video stream and an identification of said region-of-interest, receiving from said receiver a user selection of said region-of-interest, wherein said selection forms a selected object, dividing said video stream into a first part comprising said selected object and a second part comprising at least a stream of said video stream less said first part, and communicating said first part and said second part to said receiver.

In further embodiments, said first part comprises a first video stream and said second part comprises a second video stream.

In additional embodiments, said processor further executes software program instructions to perform operations comprising transmitting an interleaved multimedia stream comprising said first video stream comprising a plurality of first communication elements, said second video stream comprising a plurality of second communication elements, wherein said interleaved multimedia stream comprises an interleaved sequence of said first and second communication elements, and wherein at least one first communication element is associated with at least one second communication element, at least one of temporally and spatially.

According to further embodiments, said interleaved multimedia stream additionally comprises at least one communication element providing said association between said at least one first communication element and said at least one second communication element.

In additional embodiments, said second part is at least one of cropped to fit a display screen, shrunk to fit said display screen, and converted into non-linear mode to fit said display screen.

In some embodiments, said first part comprises relatively high-quality video and said second part comprises relatively low-quality video.

According to further embodiments, said low-quality of said second part is adapted to at least one of an area size of said screen display allocated to display said second part, a display parameter of said screen display allocated to display said second part, and a communication parameter of a network communicatively coupling said transmitter and a communication device comprising said screen display.

In further embodiments, said high-quality and low-quality are based on at least one of bandwidth allocated to said first part, bandwidth allocated to said second part, compression allocated to said second part, compression allocated to said first part, lossy compression allocated to said second part, loss-less compression allocated to said first part, resolution allocated to said first part, resolution allocated to said second part, color depth allocated to said first part, and color depth allocated to said second part.

According to additional embodiments, said processor executing said software program instructions additionally provides conversion of said second part into a non-linear mode to fit to said screen display of said receiver, and conversion of said first part into a linear mode to fit to said screen display of said receiver.

In further embodiments, said transmitter comprises at least one of a portable server, a network server, and an intermediary location in a communication network connecting said transmitter and said recipient.

Additional disclosed embodiments include a receiver of object-oriented-zoom. The receiver may comprise a processor executing software program instructions to perform operations comprising receiving from a transmitter a captured video stream and an identification of at least one region-of-interest in said video stream, marking said at least one region-of-interest on a display of said captured video stream, receiving from a user a selection of said at least one region-of-interest, wherein said selection forms a selected object, communicating said selection to said transmitter, receiving from said transmitter a first part comprising said selected object, and a second part comprising at least part of said captured video stream less said first part, and displaying at least a portion of said first part and said second part simultaneously.

According to some embodiments, said first part comprises a first video stream and said second part comprises a second video stream.

In some embodiments, said processor executes software program instructions to perform operations comprising receiving an interleaved multimedia stream comprising said first video stream comprising a plurality of first communication elements, and said second video stream comprising a plurality of second communication elements, wherein said interleaved multimedia stream comprises an interleaved sequence of said first and second communication elements, and wherein at least one first communication element is associated with at least one second communication element, at least one of temporally and spatially.

According to some embodiments, said interleaved multimedia stream additionally comprises at least one communication element providing said association between said at least one first communication element and said at least one second communication element.

In further embodiments, said processor executing said software program instructions additionally provides receiving a size selection of said selected object, and displaying said selected object while performing at least one of preserving said selected size of said selected object, and preserving at least one of a center location and a location of center of said selected object on said screen display.

In additional embodiments, said selected object comprises a plurality of regions-of-interest, wherein said processor executing said software program instructions additionally provides at least one of preserving a size between said plurality of regions-of-interest, and preserving at least one of center locations and locations of center of said plurality of regions-of-interest.

According to further embodiments, said first part comprises relatively high-quality video and said second part comprises relatively low-quality video.

In additional embodiments, said low-quality of said second part is adapted to at least one of an area size of said screen display allocated to display said second part, a display parameter of said screen display allocated to display said second part, and at least one communication parameter of a network communicatively coupling a transmitter of said second part and said receiver.

According to further embodiments, said high-quality and low-quality are based on at least one of bandwidth allocated to said first part, bandwidth allocated to said second part, compression allocated to said second part, compression allocated to said first part, lossy compression allocated to said second part, loss-less compression allocated to said first part, resolution allocated to said first part, resolution allocated to said second part, color depth allocated to said first part, and color depth allocated to said second part.

Some embodiments may also comprise at least one of converting said second part into a non-linear mode, and converting said first part into a linear mode.

A further disclosed embodiment includes a computer program product embodied on a non-transitory computer readable medium. The computer program product may comprise computer code for identifying, in a transmitter, at least one region-of-interest in a captured video stream, communicating to a receiver said video stream and an identification of said region-of-interest, receiving a selection of said region-of-interest, wherein said selection forms a selected object, dividing said video stream, in said transmitter, into a first part comprising said selected object, and a second part comprising at least a part of said captured video stream less said first part, communicating said first part and said second part to said receiver, and enabling the display of said first part and said second part simultaneously.

In some embodiments, said first part comprises a first video stream and said second part comprises a second video stream.

Some embodiments also comprise computer code for receiving an interleaved multimedia stream comprising said first stream comprising a plurality of first communication elements, said second stream comprising a plurality of second communication elements, wherein said interleaved multimedia stream comprises an interleaved sequence of said first and second communication elements, and wherein at least one first communication element is associated with at least one second communication element, at least one of temporally and spatially.

According to some embodiments, said interleaved multimedia stream additionally comprises at least one communication element providing said association between said at least one first communication element and said at least one second communication element.

Further embodiments also comprise receiving a size selection of said selected object, and displaying said selected object while performing at least one of preserving said selected size of said selected object, and preserving at least one of a center location and a location of center of said selected object on said screen display.

In additional embodiments, said selected object comprises a plurality of regions-of-interest, and at least one of wherein said step of preserving said selected size of said selected object comprises preserving said size between said plurality of regions-of-interest, and wherein said step of preserving at least one of said center location and said location of center of said selected object comprises preserving said location of center of said plurality of regions-of-interest.

Further embodiments comprise at least one of cropping said first part to fit a display screen, shrinking said first part to fit said display screen, and converting said first part into a non-linear mode to fit said display screen.

According to additional embodiments, said first part comprises relatively high-quality video and said second part comprises relatively low-quality video.

In some embodiments, said low-quality of said second part is adapted to at least one of an area size of said screen display allocated to display said second part, a display parameter of said screen display allocated to display said second part, and a parameter of a network communicatively coupling said transmitter and a communication device comprising said screen display.

According to further embodiments, said high-quality and low-quality are based on at least one of bandwidth allocated to said first part, bandwidth allocated to said second part, compression allocated to said second part, compression allocated to said first part, lossy compression allocated to said second part, loss-less compression allocated to said first part, resolution allocated to said first part, resolution allocated to said second part, color depth allocated to said first part, and color depth allocated to said second part.

Some embodiments comprise at least one of converting said second part into a non-linear mode, and converting said first part into a linear mode.

In further embodiments, said first part and said second part are created by at least one of creating at least one of said parts by a processor of an imaging device capturing said video stream, creating at least one of said parts by a processor of a first transmitter, creating at least one of said parts by a processor of a recipient communication terminal, creating at least one of said parts by a processor of a network server, and creating at least one of said parts by a processor of an intermediary location in a communication network connecting said transmitter and said recipient.

A further disclosed embodiment includes a computer-implemented method for object-oriented-zoom. The method may comprise transmitting, from a transmitter, a captured video stream and an identification of at least one region-of-interest in said captured video stream, receiving, at said transmitter, a selection of a marked region-of-interest within said captured video stream, wherein said selection forms a selected object, and transmitting, from said transmitter, a divided version of said video stream, said divided version of said video stream including a first part comprising said selected object, and a second part comprising at least a part of said video stream less said first part.

An additional disclosed embodiment includes a computer program product embodied on a non-transitory computer readable medium. The computer program product may comprise computer code for receiving, at a receiver, a captured video stream and an identification of a region-of-interest within said captured video stream, receiving, at said receiver, a selection of said region-of-interest, wherein said selection forms a selected object, receiving, at said receiver, a divided version of said video stream, said divided version including a first part comprising said selected object, and a second part comprising at least a part of said video stream less said first part, and displaying, on said receiver, at least a portion of said first part and said second part simultaneously.

In accordance with additional embodiments of the present disclosure, a computer program product embodied on a non-transitory computer readable medium is disclosed that stores instructions that, when executed by a processor(s), causes the processor(s) to perform operations consistent with one or more of the disclosed methods and embodiments.

It is to be understood that both the foregoing general description and the following detailed description are by example and explanatory only, and are not restrictive of the disclosed embodiments, as claimed.

BRIEF DESCRIPTION OF THE DRAWINGS

Various embodiments are described herein, by way of example only, with reference to the accompanying drawings. With specific reference now to the drawings in detail, it is stressed that the particulars shown are by way of example and for purposes of illustrative discussion of the preferred embodiments only, and are presented in order to provide what is believed to be the most useful and readily understood description of the principles and conceptual aspects of the embodiment. In this regard, no attempt is made to show structural details of the embodiments in more detail than is necessary for a fundamental understanding of the subject matter, the description taken with the drawings making apparent to those skilled in the art how the several forms and structures may be embodied in practice.

In the drawings:

FIG. 5 is a simplified illustration of a display of the five frames of the video stream of scenery, as captured, with object indicators;

FIG. 6 is an illustration of the five frames of FIGS. 4 and 5 as displayed after a zoom operation;

FIG. 7 is an illustration of the five frames including a selected object including a plurality of selected recognized objects as displayed after a zoom operation;

FIG. 8 is a simplified illustration of a communication channel including a wearable camera and a portable server;

FIG. 9A is an illustration of a linear-mode display of scenery; and

FIG. 9B is an illustration of a non-linear-mode display of scenery.

DETAILED DESCRIPTION

Figure 1:
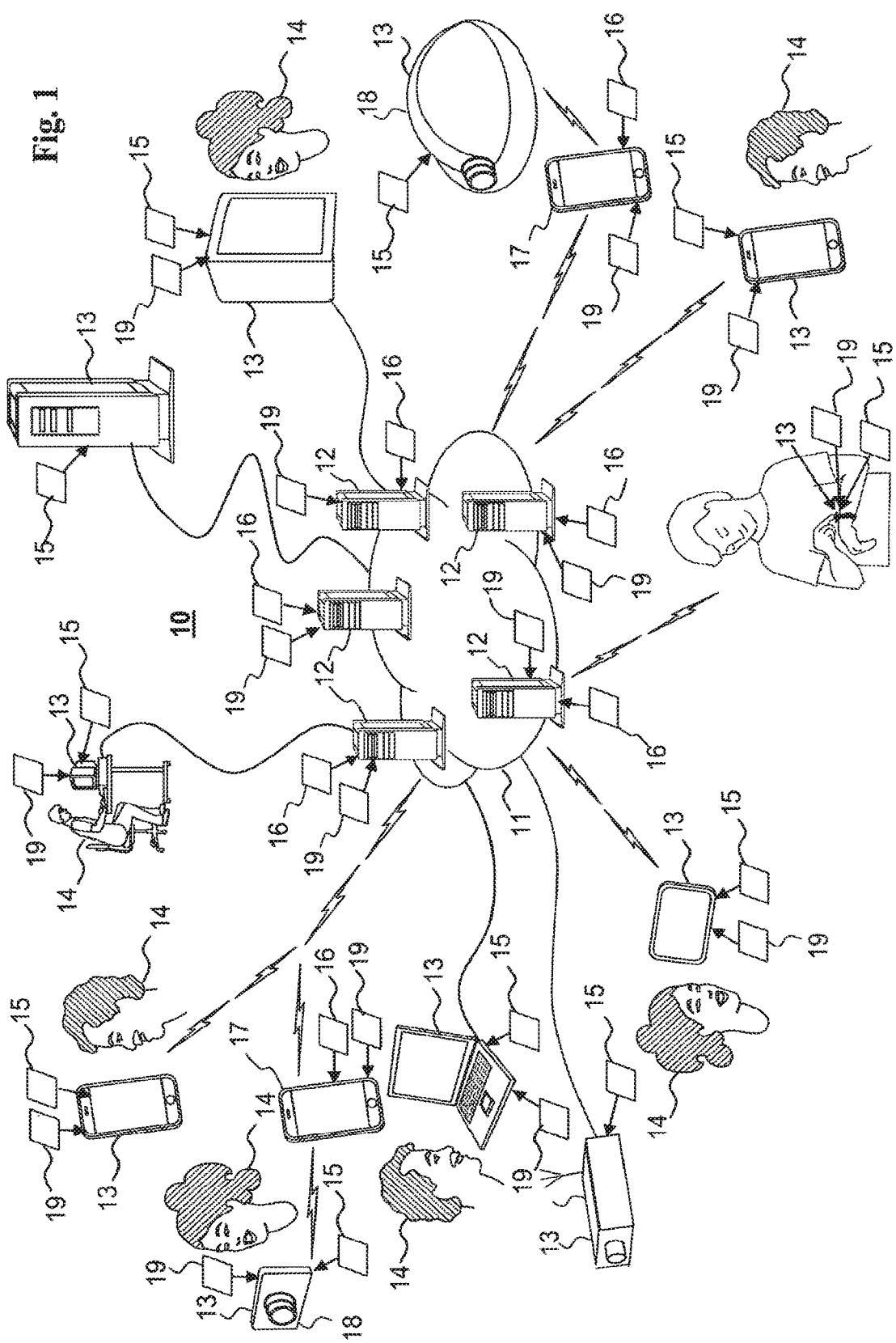
FIG. 1 is a simplified illustration of a video zooming system.

Reference will now be made in detail to the disclosed embodiments, examples of which are illustrated in the accompanying drawings.

The present embodiments comprise a method, a device, and a computer program for stabilizing displayed objects in a video stream. The principles and operation of the devices and methods according to the several exemplary embodiments presented herein may be better understood with reference to the following drawings and accompanying description.

Before explaining at least one embodiment in detail, it is to be understood that the embodiments are not limited in its application to the details of construction and the arrangement of the components set forth in the following description or illustrated in the drawings. Other embodiments may be practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different figures may use different scales and different scales can be used even within the same drawing, for example different scales for different views of the same object or different scales for the two adjacent objects.

Several disclosed embodiments involve providing at least one system and/or method and/or a computer program for stabilizing at least one object in a video stream, or a video message. Such video stream or video message may be part of a multimedia message, or multimedia file, communicated from a first terminal device, typically including a camera, to a second terminal device, typically including a screen display. Such video stream or video message or multimedia message, or multimedia file, may be communicated from the first terminal device to the second terminal device via a communication network, and particularly via a communication node, or communication server.

The term 'multimedia,' or 'multimedia content,' may refer to any combination of two or more content types. A content type, or medium, may be sound, speech, image, picture, video, text, graphics, animation, data, metadata, control information, session information, etc.

The term 'data,' particularly as a content type or medium, may refer to data referencing between elements of different media, such as sync information (e.g., lip-sync data. The term 'data' may also refer to measurement information such as location (e.g., GPS data), motion (e.g., accelerometer and/or gyro data), orientation (e.g., gravimeter, gyro, and/or compass data), timing information (e.g., lip-synch), biometric data (e.g., heartbeat rate, skin conductivity), etc.

The term 'stream' or 'streaming,' such as in 'video stream,' 'streaming content,' 'streaming information,' or 'streaming multimedia,' may refer to content such as sound and video that each is produced, communicated, and consumed in a fixed or constant rate. A bit rate of the communication network may vary, but it is desirable for each packet of a media stream to arrive at a recipient strictly on time according to the fixed rate of the transmitted medium. According to the exemplary embodiments, several media may be accommodated in an interleaved file, each with its own rate, and it is desirable that packets of each medium arrive (strictly) in time. As the network's bit rate may change, a media type may be altered or may be replaced with another that is compatible with the current bit rate, so that packets arrive (strictly) on time.

The term 'synchronization' or 'synchronized' refers to temporal reference or correlation between any two or more content types, such as sound accompanying video. For example, lip-synch correlates the movement of the lips of a speaker with the speaker's speech (and vice-versa). Streaming multimedia may involve accurate synchronization between at least some of the components (content types, media) of the stream.

The term 'image' in this context refers to any type or technology for creating imagery data, such as photography, still photography (still image, still picture, or simply picture), video photography, stereo-photography, three-dimensional (3D) imaging, thermal or infra-red (IR) imaging, etc.

In this context any such image may be 'captured,' 'obtained,' or 'photographed'.

The term 'camera' in this context refers to a device of any type or technology for creating one or more images or imagery data such as described herein, including any combination of imaging type or technology, etc.

The term 'server' or 'communication server' refers to any type of computing machine connected to a communication network facilitating communication between one or more cameras (e.g., a local camera) and one or more remote users and/or remote systems.

The term 'network' or 'communication network' refers to any type of communication medium, including but not limited to, a fixed (wire, fiber, cable) network, a wireless network, and/or a satellite network, a wide area network (WAN) fixed or wireless, including various types of cellular networks, a local area network (LAN) fixed or wireless, and a personal area network (PAN) fixed or wireless, and any combination thereof.

The term 'zoom' may refer to any changing and/or manipulation made to the image, between capturing the image to displaying the image. Particularly, but not exclusively, zoom may refer to changing the size of the image, and/or to cropping a part of the image. More particularly, but not exclusively, the term 'zoom' may refer to presenting a part of the image in a different size (magnified or decreased) than the original size, and optionally, presenting another part of the image in a different size. Even further, the term 'zoom' may refer to changing one or more of the dimensions (e.g., the aspect ratio) of an image or a part of the image, and/or distorting the image (such as fisheye distortion), and/or correcting distortion (e.g., correcting fisheye distortion).

It is appreciated that network bandwidth is often a scarce resource, and that image instability creates a load on the bandwidth and/or limits most of the methods used to reduce bandwidth consumption, such as compression. Image zoom, and/or similar methods of stabilizing an image, may contribute to, or enhance, optimizing bandwidth usage.

It is appreciated that network bandwidth may change with time, therefore affecting the amount of data that can be communicated over a particular leg of a network in a particular transfer rate over a particular period of time. Therefore the content, particularly the streaming content, should be adapted to the network bandwidth, for example by changing the compression level, changing the image resolution, removing components or parts of the communicated content and/or data, replacing components or parts of the communicated content and/or data with less demanding content and/or data, etc.

Reference is now made to FIG. 1, which is a simplified illustration of a video zooming system 10, according to one exemplary embodiment.

As shown in FIG. 1, video zooming system 10 may include a communication network 11 in which one or more multimedia communication servers 12 may be distributed forming a server cloud. Servers 12 may communicate with communication terminals 13 (e.g., receivers and transmitters), some of which may be operated by users 14.

One or more of communication terminals 13 may each create or obtain content and transmit it to one or more other communication terminals 13 that may receive the transmitted content and provide it to their respective users 14. Typically, the content transmitted between the communication terminals 13 may include video (e.g., streaming video and/or video stream). Typically, a transmitter communication terminal 13 may include a camera (e.g., a video camera), and a recipient communication terminal 13 may include a screen display for displaying the received video.

Typically, a transmitter communication terminal 13 may transmit the content to one of servers 12, which may then communicate the content to one or more other servers 12, which may then communicate the content to their respective recipient terminals 13.

It is appreciated that a transmitter communication terminal 13 may become a receiver, and a recipient terminal 13 may become a transmitter. It is appreciated that a server 12 may be regarded as a combination of a receiver and a transmitter, the receiver receiving communications from a transmitter communication terminal 13 and the transmitter transmitting communications to a recipient communication terminal 13. It is appreciated that a server 12 may include any number of such receivers and transmitters.

A communication terminal 13 may be any type of computation device that can create or obtain any type of content, and/or receive and provide to a user any type of content. Content type, or medium, may be sound, speech, image, picture, video, text, graphics, animation, data, metadata, control information, session information, etc. Multimedia content refers to any combination of two or more content types (media). Particularly, synchronously coupled combination of two or more media.

Communication terminal 13 may be, for example, a desktop computer, a laptop computer, a tablet computer, a mobile communication device such as a cellular telephone or a smartphone, a camera having communication capabilities, a car-mounted camera, etc., and particularly a wearable device. A wearable device such as a smart-watch, a wrist-mounted camera, a head-mounted camera, a helmet-mounted camera, glasses with a display and/or a camera (smart-glasses), including various wearable sensors such as biometric sensors and environmental/ambiance sensors.

Communication terminals 13 and communication servers 12 may include an object-oriented zoom software program (i.e., zooming software). Typically, communication terminals 13 may include client zooming software 15, and communication servers 12 may include server zooming software 16.

Typically, a communication terminal 13, and/or its client zooming software 15, may create or obtain content, open a communication channel to one or more other communication terminals 13 or to a server 12, and transmit the content thereto via the communication channel.

Typically, a communication terminal 13, and/or its client zooming software 15, may open a communication channel with one or more other communication terminals 13 or to a server 12, and receive content therefrom via the communication channel.

Typically, a server 12 and/or its server zooming software 16, may open a communication channel with one or more communication terminals 13, typically in response to a request from the communication terminal 13, to receive content from a transmitting communication terminal 13 or another server 12, and/or to transmit content to a recipient communication terminal 13 or another server 12. In a typical channel a first communication terminal 13 creates and transmits content to a first server 12, which transmits the content to one or more other servers 12, which transmits the content to one or more recipient communication terminals 13.

A server of video zooming system 10 may take the form of a portable server 17. Portable server 17 may operate in any type of portable computing and/or communication device such as a smartphone. A portable server 17 may operate as a regular server 12 being a part of the server cloud, or in addition to the server cloud, operating as a secondary communication layer, co-located with a content input/output device that does not have long-range communication capabilities. A portable server 17 may be carried by a user or worn by a user (e.g. a wearable computer).

For example, as shown in FIG. 1, a terminal 13 designated by numeral 18 (e.g., a hand-held camera, a helmet-mounted camera, a car mounted camera (not shown), etc.) may communicate with a collocated portable server 17 using a short-range communication network such as Bluetooth, Wi-Fi, etc. The portable server 17 may then communicate with a server 12 via a cellular network. It is appreciated that a portable server 17 may execute both client zooming software 15 and server zooming software 16.

The content transferred between communication terminals 13 and servers 12 is typically considered multimedia content as it may include two or more media. These different media may be of the same content type or of different content types, such as sound, speech, image, picture, video, text, graphics, animation, data, metadata, control information, session information, etc.

Each of the entities of video zooming system 10, such as communication terminals 13 and servers 12, may store, or save, any part of any content, or message, communicated by video zooming system 10.

Each of the entities of video zooming system 10, such as communication terminals 13 and servers 12, may zoom any part of video content communicated by video zooming system 10. Such zoom may be performed 'online,' or in real-time, on content and/or messages as the content and/or message is being communicated between communication terminals 13 and servers 12. Alternatively zoom may be performed 'offline,' or in batch-mode, on content and/or messages stored or save by any of the communication terminals 13 and servers 12. Such zoom may be performed by one entity on content and/or messages stored or saved by another entity, or in cooperation with the other entity, where each entity performs a different part of the zoom process.

For that matter, each of the entities of video zooming system 10 may include a zoom facility 19, for example, as a software program executed by a processor of the respective network entity of video zooming system 10.

Figure 2:
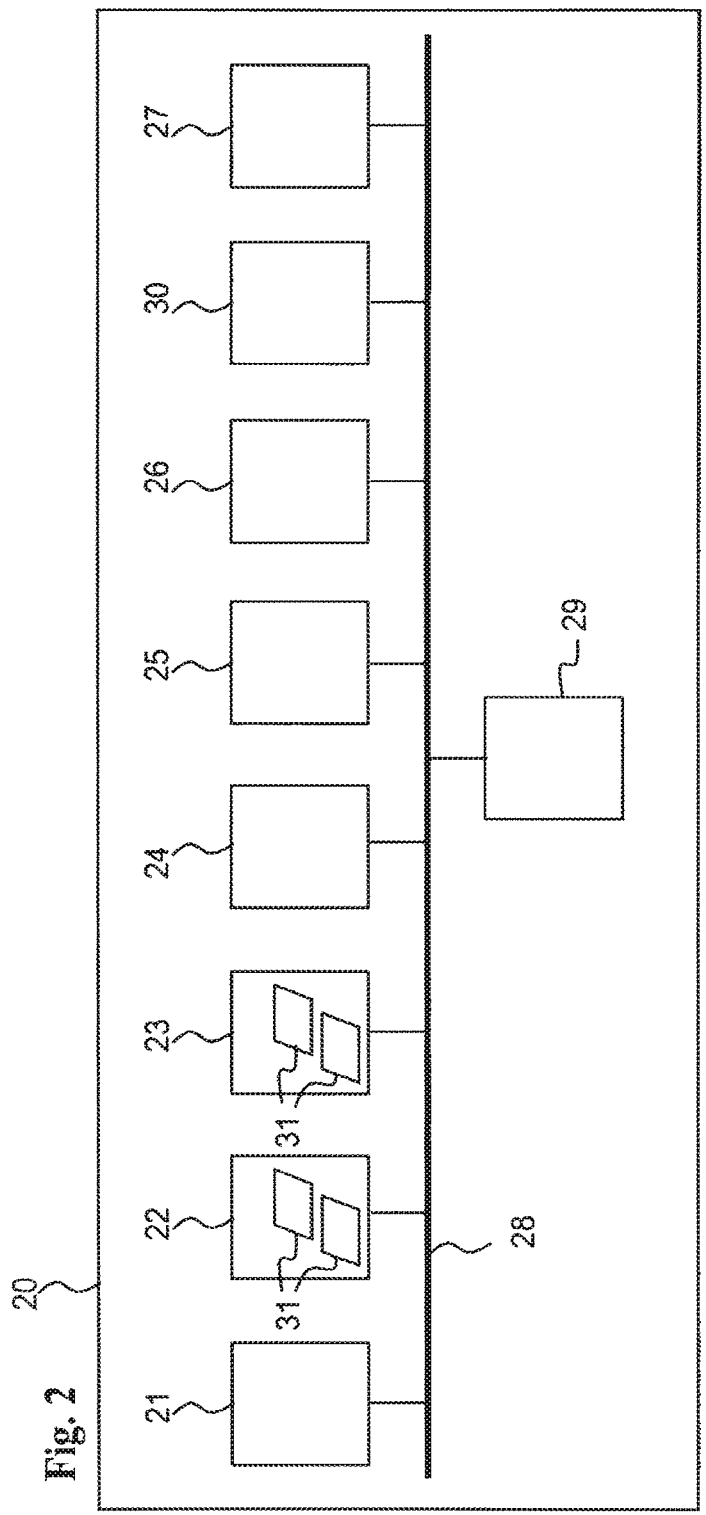
FIG. 2 is a simplified block diagram of a computing system used by the video zooming system.

Reference is now made to FIG. 2, which is a simplified block diagram of a computing system 20, according to one exemplary embodiment. As an option, the block diagram of FIG. 2 may be viewed in the context of the details of the previous or following figures. Of course, however, the block diagram of FIG. 2 may be viewed in the context of any desired environment. Further, the aforementioned definitions may equally apply to the description below.

The block diagram of computing system 20 may represent a general example of a device used for executing client zooming software 15 and/or server zooming software 16, and/or video zooming software program 19, or any other type of software program. For that purpose computing system 20 may represent a communication terminal 13 and/or server 12 and/or portable server 17.

The term 'computing system' or 'computing device' relates to any type or combination of computing devices, or computing-related units, including, but not limited to, a processing device, a memory device, a storage device, and/or a communication device.

As shown in FIG. 2, computing system 20 may include at least one processor unit 21, one or more memory units 22 (e.g., random access memory (RAM), a non-volatile memory such as a Flash memory, etc.), one or more storage units 23 (e.g., including a hard disk drive and/or a removable storage drive, representing a floppy disk drive, a magnetic tape drive, a compact disk drive, a flash memory device, etc.). Computing system 20 may also include one or more communication units 24, one or more graphic processors 25 and displays 26, a variety of user input and output (I/O) devices 27, and one or more communication buses 28 connecting the above units. Computing system 20 may be powered by a power supply 29, which may include a battery.

Computing system 20 may also include an imaging sensor 30 configured to create a still picture, a sequence of still pictures, a video clip or stream, a 3D image, a thermal (e.g., IRK) image, stereo-photography, and/or any other type of imaging data and combinations thereof.

Computing system 20 may also include one or more computer programs 31, or computer control logic algorithms, which may be stored in any of the memory units 22 and/or storage units 23. Such computer programs, when executed, enable computing system 20 to perform various functions (e.g., as set forth in the context of FIG. 1, etc.). Memory units 22 and/or storage units 23 and/or any other storage are possible examples of tangible computer-readable media.

Particularly, computer programs 31 may include client zooming software 15 and/or server zooming software 16 and/or video zooming software 19. Computer programs 31 may also, or alternatively, include transmitter communication software and/or receiver communication software or module. Computer programs 31 may also, or alternatively, include multimedia file processing software or modules. Any such software or module may be embodied in the form of a hardware module or unit.

Communication units 24 may support one or more types of communication technologies such as short-range communication (e.g., PAN, such as USB, Wi-Fi, Bluetooth, etc.) or long-range communication (e.g., Ethernet, IP, Cellular, WiMAX, etc.), whether wired or wireless. For that matter, computing system 20 and/or communication units 24 may include a subscriber identity module (SIM) or a similar device.

Figure 3:
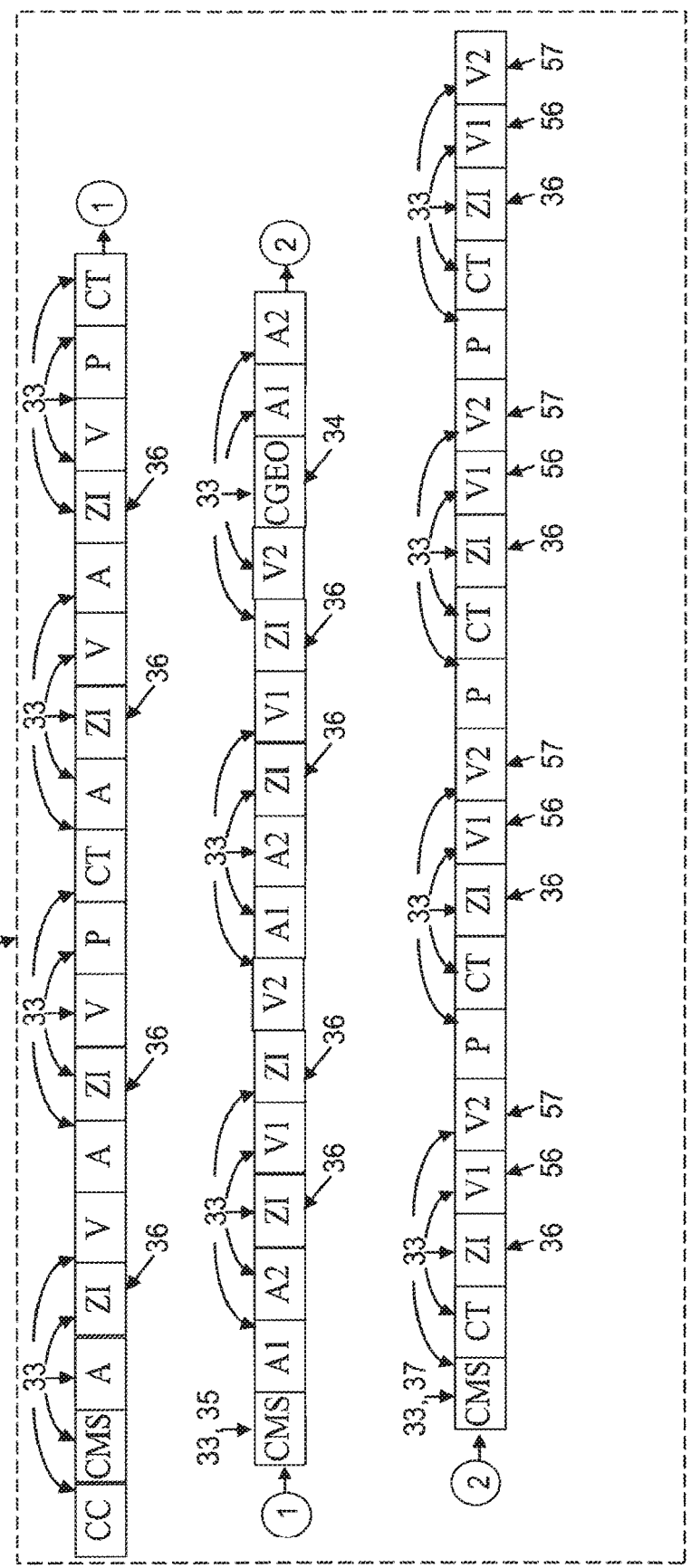
FIG. 3 is a simplified block diagram of streaming multimedia.

Reference is now made to FIG. 3, which is a simplified block diagram of streaming multimedia 32, according to one exemplary embodiment.

As an option, the block diagram of FIG. 3 may be viewed in the context of the details of the previous or following figures. Of course, however, the block diagram of FIG. 3 may be viewed in the context of any desired environment. Further, the aforementioned definitions may equally apply to the description below.

The term 'streaming multimedia' may refer, for example, to a stream file, or a message, sent by a transmitter to a receiver, typically via one or more servers. The block diagram of FIG. 3 may be regarded as a description of the structure of data elements 33 of streaming multimedia 32 sent over time from a transmitter to a receiver, where the right element 33 follows the left element 33 in time. The elements of the streaming multimedia 32 are ordered by time from left (early) to right (later), and top line to bottom.

Streaming multimedia 32 as described herein may be carried by any type of communication technology, for example as, or within, the application layer of an ISO OSI networking model. For example, streaming multimedia 32 may be communicated over the Internet protocol (IP), for example using TCP, UDP and/or RTP. For example, the streaming multimedia 32 of FIG. 3 may support RTP over TCP.

As shown in FIG. 3, streaming multimedia 32 may include a plurality of elements 33 including control information, data, and various types of media according to a communication protocol of the exemplary embodiments. A data element 33 may be embodied, for example, as a communication packet, such as in a packet switching communication technology. In the example of FIG. 3, such elements 33 may be designated types of control information, data, and media:

'CC' designates a Configuration Control packet describing the stream.

'CMS' designates a Media Shift Control packet specifying continuing tracks.

'V' designates a Video data packet.

'Z1' designates a Zoom information packet

'A' designates an Audio data packet.

'P' designates a Picture packet.

'CT' designates a Control Text packet.

'CGEO' designates a Control Geolocation packet.

'A1' and 'A2' may designate two different audio channels, such as a stereo sound. 'V1' and 'V2' may designate two different video channels, for example from two cameras, such as a stereoscopic camera or a forward looking camera and a backward looking (selfie) camera of a smartphone, smartwatch, and/or wrist-mounted camera. Other types of media are possible, such as graphics, and animation. CGEO 34 is an example of a data packet carrying any type of data such as measurements derived from sensors such as GPS, accelerometer, gyro, gravimeter, compass, biometric data, timing information (e.g., lip-synch), meta-data, etc.

'CC' and 'CMS' are examples of types of control packets, typically containing control information. 'CC,' or Configuration Control packet, is a data element 33 typically including a description of the types of media elements in a stream. Typically, a CC element is provided as a header of a session or a message. A CMS element may then be used to remove, add, change, and/or replace types of media elements following the CMS element.

In the example of streaming multimedia 32 as shown in FIG. 3, streaming multimedia 32 includes an audio stream A, a video stream V, a plurality of pictures P and a plurality of textual components CT. The textual components may be, for example, messages (e.g., as in instant messaging), subtitles, comments, etc. The various elements 33 may be correlated, and/or synchronized. The various elements 33 may be correlated, and/or synchronized in time and/or in space.

For example, the audio and the video streams are correlated so that they can be provided or displayed to a user in a synchronized manner. The textual components may be correlated with the video or picture elements so that they can be displayed to a user over the correct image.

The CMS element designated by numeral 35 adds, for example, a second audio stream A2 and a second video stream V2 to the streaming multimedia 32, as well as location data CGEO.

Zoom Information packet 36 may include data regarding zoom effects, associated with a particular video packet, or a plurality of video packets typically following the zoom information packet. Particularly, Zoom Information packet 36 may include data associating two or more elements 33 of different video streams (e.g., V1 and V2). It is appreciated the content (data) of Zoom Information packet 36 may be alternatively, or optionally, included in the respective communication elements 33 of the respective video streams (e.g., V1 and V2).

It is appreciated that streaming multimedia 32 may be stored or transmitted as a single multimedia content file including any combination of content types, and/or any combination of media streams, and/or any number of content types, and/or media streams. The particular combination, or configuration, of media streams, and/or content types, is typically designated by the CC element and can be modified by the CMS element. The media streams, and/or content types are then multiplexed within the streaming multimedia content 32 as a sequence of elements 33.

An element 33 may include a header part and a payload part. The header part may contain parameters such as source ID, type indicator, timing stamp, sequence number, payload quantity, etc.

The source ID may uniquely identify the device originating, creating, and/or producing the data or content contained in the payload part.

The type indicator may indicate the type of the data or content contained in the payload part, such as audio, video, picture, control, etc.

The timing stamp may indicate the time of creation of the particular element. The timing stamp may be absolute (e.g., GMT) or relative. Relative time stamp may refer to the beginning of the multimedia file 32, or relative to the beginning of the particular stream (e.g., A1, V2, etc.) within the multimedia file, or relative to the last (most recent) CC or CMS element, etc.

The sequence number may indicate the number of the particular element with respect to the beginning of the particular stream (e.g., the stream of A1 elements, the stream of V2 elements, etc.) within the multimedia file, or relative to the last (most recent) CC or CMS element, etc.

The payload quantity may indicate how much payload is contained in the payload part, for example, in bits, bytes, seconds, frames, etc. The payload part may contain data and/or content typically pertinent to the type indicated in the header part. The payload quantity, and/or the size of the payload part, may be variable. In this respect, each type of medium, and/or each medium stream within the multimedia file 32, may have a different and/or particular size of payload part. However, typically, or optionally, elements of a particular type may have the same payload size following a particular CMS element (or between CMS elements).

It is appreciated that the structure of the multimedia file 32, as well as the structure of the elements 33, enable efficient random access to each and any element 33 within the multimedia file 32. Particularly the structure of the multimedia file 32, as well as the structure of the elements 33, enable efficient direct access to each and any element 33 within each medium stream, or medium type, within the multimedia file 32. For example, it is possible to access particular elements 33 of a particular medium stream, or medium type without having to read all the elements 33 preceding the target element 33, or even the elements 33 preceding the target element 33 within a particular medium type or stream.

It is appreciated that each streaming element 63 within the multimedia file 62 may arrive at the receiver strictly in time. The interleaved multimedia file 62 may accommodate several media, each with its own (streaming) rate. The protocol of multimedia file 62 enables element 63 of each medium to arrive (strictly) in time according to the streaming rate of the particular medium. In some embodiments, as the network's bit-rate may change, one or more media types of the multimedia file 62 may be replaced with another medium type that is compatible with the current bit rate, enabling element 63 to arrive (strictly) on time.

It is appreciated that the various elements of the streaming multimedia 32 may be tightly and/or accurately correlated and/or synchronized as described above, independently of the particular configuration of streaming multimedia 32. In that respect, any combination and/or number of types carried by streaming multimedia 32 may be tightly and/or accurately correlated and/or synchronized.

The structure of the multimedia file 32 and its elements 33 may further enable a consolidated clock, or timing, or synchronization of the various media streams and their elements 33, with respect to the consolidated clock. The consolidated clock is typically provided at the origin, such as by the original transmitter and/or the source devices. Therefore the consolidated clock of a particular multimedia file 32 consolidates the clocks of the various source devices into a single, synchronized multimedia file 32. Therefore, media streams may be extracted and/or added to the multimedia file 32 by consolidating their respective clocks to the consolidated clock of the multimedia file 32.

It is appreciated that the content, or the structure, or the configuration, of streaming multimedia 32 may be altered without closing the file, without initiating the transfer of a new file, and without affecting the correlation and/or synchronization between elements of streaming multimedia 32. A content type may be extracted, removed, added, changed and/or replaced while preserving the correlation and/or synchronization between the elements of streaming multimedia 32.

Therefore, a receiver such as recipient communication terminal 13, and/or server 12, may receive a single data stream such as streaming multimedia 32, and extract any number of elements 33 of any selected medium. Therefore, such receiver may separate (e.g., demultiplex) the single data stream into a plurality of media, while preserving the correlation and/or synchronization between the elements 33 of streaming multimedia 32.

A receiver, and/or a transmitter, and/or a communication terminal 13 and/or server 12, may include a module or a unit (comprising hardware and/or software) such as a streaming file processing module or unit that is capable of processing a streaming multimedia file by, for example, extracting, adding, converting, etc. at least one element 33 of the streaming multimedia file according to a communication protocol of the exemplary embodiments.

Hence, a transmitter such as transmitter communication terminals 13 and/or server 12, may change the configuration (or combination) of media types within a streaming multimedia 32 in real-time, while streaming multimedia 32 is being communicated, for example by inserting a CMS element. A CMS element may add, remove or replace one or more media types following the CMS element. Any number of such CMS elements can be used. While the CMS element may change the configuration of the streaming multimedia 32, the synchronization between old and new elements 33 is preserved.

For example, as shown in FIG. 3, a first CMS configures streaming multimedia 32 to carry an audio channel A, a video channel V, pictures P and text T. The second CMS designated by numeral 35 changes the configuration by adding a second audio channel, a second video channel, and geolocation data. A third CMS designated by numeral 37 changes the configuration of streaming multimedia 32 by removing the audio channels and the second video channel, inserting a text channel (for example replacing the audio channels) and inserting a sequence of pictures (for example replacing the video channels).

It is therefore appreciated that the structure of the multimedia file 32 and its elements 33 may further enable a server to communicate to any other server or a recipient terminal to provide to a user, any part of the multimedia file 32, from any point within the multimedia file 32, whether a single stream or a combination of streams. Such part of the multimedia file 32 may be communicated or provided immediately, or with low latency, preserving the original structure and/or format of the file or stream. In this respect, if an element 33 is lost, and/or delayed and/or corrupted, the particular missing element 33 is omitted from the data further communicated and/or provided to a user.

The multimedia file 32 and its elements 33 may further enable a server and/or a recipient terminal to reconstruct the synchronization between elements 33 of the same stream and/or different streams even if some parts of the multimedia file 32 are missing, or cut out, or if the multimedia file 32 is communicated from any arbitrary point of the original multimedia file 32.

For example, a multimedia file 32 may be transmitted or retrieved from an arbitrary point by adding a CC element 33 in the beginning, where the CC element is adapted to types of the immediately following content-bearing elements 33. Thereafter, adding a CMS element 33 may add a new type of content for the following content-bearing elements 33. Typically, the CC may be identified with each originating transmitter device (e.g., a device creating a multimedia file) and vice-versa (a particular originating device may have a particular constant CC). Therefore, if the originating device of a particular multimedia file is known, the CC is also known, and may be added ahead of any part of the particular multimedia file.

Therefore, for example, a portable server (e.g., server 17 of FIG. 1) may receive streaming multimedia 32 created by remote communication terminals 13 and communicated via one or more servers 12. Portable server 17 may then provide the contents of the streaming multimedia 32 to a user 14 using any combination of the output devices available (e.g., smartphone, smartwatch, and smart-glasses), while preserving the correlation and/or synchronization between the elements 33 of streaming multimedia 32.

Similarly, portable server 17 may collect various content streams and/or data (e.g., from the smartphone, smartwatch, and smart-glasses), create streaming multimedia 32, and communicate the streaming multimedia 32 via one or more servers 12 to any number of recipient communication terminals. Portable server 17 may multiplex the collected contents or data over the streaming multimedia 32 in real-time, thus preserving the correlation and/or synchronization between the elements 33 of streaming multimedia 32.

Therefore, streaming multimedia files 32 that are stored in a storage facility of a terminal device or a server, as well as any element 33 of a multimedia file 32, may be identified by several parameters such as:

The transmitting device, the receiving device (or devices).

The person sending the content and/or message, the person receiving and/or consuming the message.

The time of creation, the time of transmission, the time of reception, the time of consumption.

The source device for each component (e.g., medium) of the multimedia file.

The above mentioned parameters may apply to each elements 33 of the multimedia file independently.

The collection of streaming multimedia files 32 stored within any and all the entities (terminal devices and servers) of the video zooming system 10 create a multimedia database. This multimedia database includes all the streaming multimedia files 32 processed by the video zooming system 10, whether stored or communicated, by any of the entities making the video zooming system 10 (e.g., (terminal devices and servers)).

Hence, when video zooming software 19 scans the multimedia database it may scan any and all of the elements 33 of the streaming multimedia files 32 in the multimedia database. Consequently, video zooming software 19 may associate and/or analyze any pair of elements 33 independently.

Figure 4:
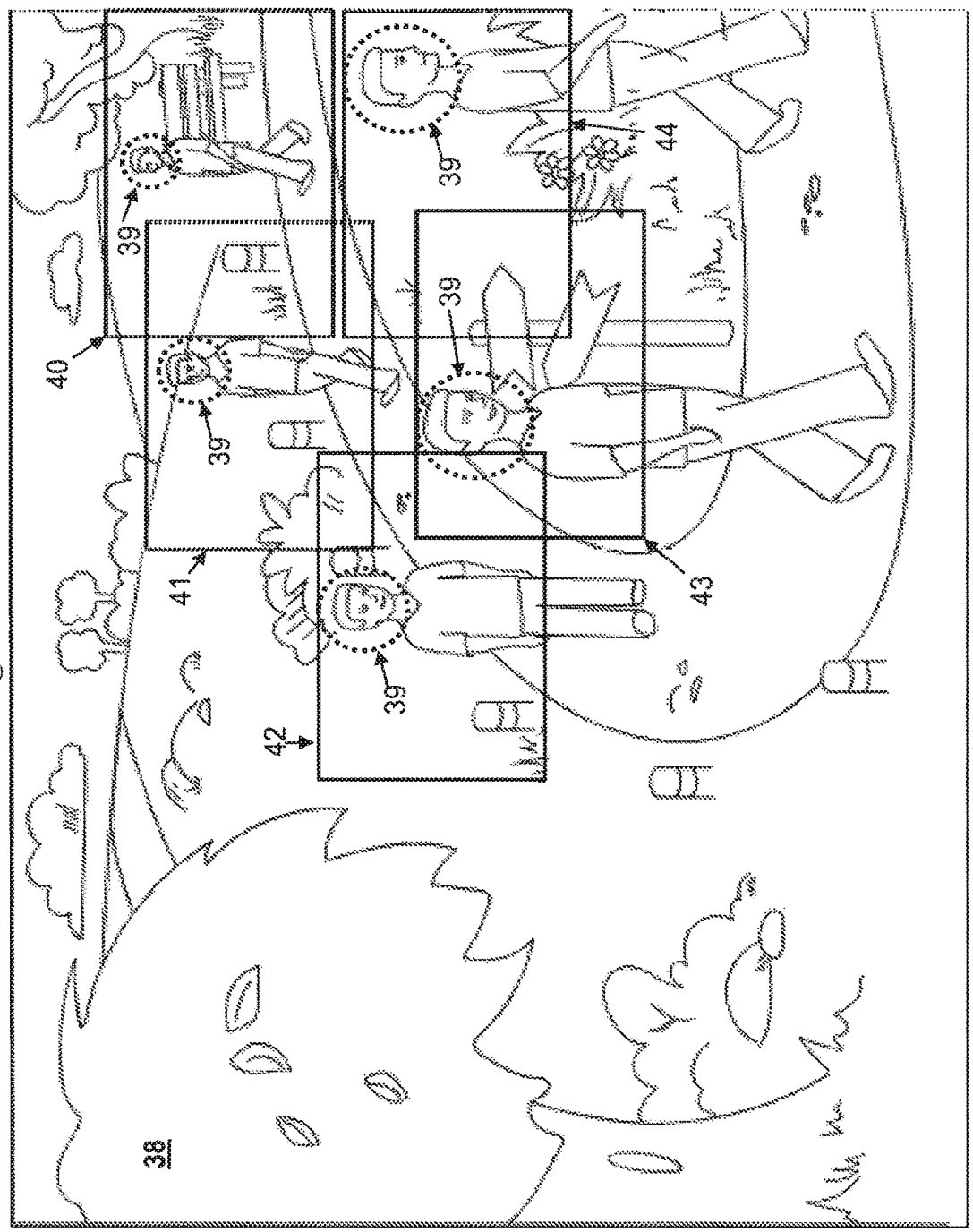
FIG. 4 is a simplified illustration of scenery captured by five frames of a video stream.

Reference is now made to FIG. 4, which is a simplified illustration of a scenery captured by five frames of a video stream, according to one exemplary embodiment.

As an option, the illustrations of FIG. 4 may be viewed in the context of the details of the previous or following figures. Of course, however, the illustrations of FIG. 4 may be viewed in the context of any desired environment. Further, the aforementioned definitions may equally apply to the description below.

As shown in FIG. 4, scenery 38 includes an object 39 moving within the scenery 38. A video stream has captured object 39 in five locations. FIG. 4 shows five frames 40, 41, 42, 43, and 44 of the video stream capturing object 39 in the respective five locations. Frames 40, 41, 42, 43, and 44 are ordered according to their respective time of capture.

Reference is now made to FIG. 5, which is a simplified illustration of a display of the five frames of the video stream of scenery 38, as captured, with object indicators 45, according to one exemplary embodiment.

As an option, the illustrations of FIG. 5 may be viewed in the context of the details of the previous or following figures. Of course, however, the illustrations of FIG. 5 may be viewed in the context of any desired environment. Further, the aforementioned definitions may equally apply to the description below.

As shown in FIG. 5, object 39 'jumps' around the display and therefore the image displayed is considered 'unstable.' However, video zooming software program 19 recognizes object 39 and therefore video zooming software program 19 may mark object 39 with a respective indicator 45 identifying object 39 as a recognized object.

FIG. 5 shows an exemplary embodiment of indicator 45 as a rectangle around object 39. However, other types of visual indicators may be used, such as heavy contour, false color, etc.

Video zooming software program 19 recognizing object 39 may be executed by a processor of the transmitter communication terminal 13, and/or by a processor of the recipient communication terminal 13, and/or by a processor of a server 12 intermediating between the transmitter and the recipient communication terminals 13.

Particularly with reference to zooming software program 19 executed by transmitter communication terminal 13, and/or by server 12, indicator 45 may be inserted into streaming multimedia 32, typically with the payload of a Zoom Information packet 36. (It is appreciated the content (data) of Zoom information packet 36 may be alternatively, or optionally, included in the respective communication elements 33 of the respective video streams).

If object 39 is determined as a recognized object by a network entity placed downstream of the transmitter communication terminal 13, such as a server 12 or a recipient communication terminal 13, such network entity may distribute such information to other entities involved, such as other servers 12, and/or other recipient communication terminals 13, an/or the transmitter communication terminal 13. Such update procedure may employ a stream of Zoom Information packets 36 bearing the respective indicator 45 and associated with their respective video packets (33).

It is appreciated that a frame such as frames 40, 41, 42, 43, and 44 may include any number of object 39 and respective indicators 45. It is appreciated that a Zoom Information packet 36 may include any number of indicators 45. It is appreciated that a communication terminal 13 may display any number of indicators 45.

A user of a communication terminal 13 may select one or more recognized objects 39 (defined by respective indicators 45) to form a selected image object. It is appreciated that a video stream including any of frames 40, 41, 42, 43, and 44, as well as objects 39 and respective indicators 45 may be displayed on a display screen of either or both the transmitter communication terminal 13 and/or the recipient terminal 13 and a user may therefore make the selection using a user interface of any of the transmitter communication terminal 13 and/or the recipient terminal 13, such as a pointing device or a touch-sensitive screen display.

It is appreciated that a Zoom Information packet 36 may include any number of indicators 45. It is appreciated that a communication terminal 13 may display any number of indicators 45. And that a selected object may include any number of indicators 45 and/or respective objects 39.

To form a selected object, a user (of transmitter communication terminal 13 and/or the recipient terminal 13) may, for example, click or tap on a displayed recognized object 39 or its respective indicator 45. A user may tap on a plurality of displayed recognized objects 39 (or their respective indicators 45) to form a selected object combining the selected plurality of recognized objects 39.

After selecting one or more recognized objects 39 to form a selected object the user of transmitter communication terminal 13 and/or the recipient terminal 13 may determine the required size of the selected object. Typically, the size of the selected object is determined as a fraction (percentage) of the screen display of the transmitter communication terminal 13 and/or the recipient terminal 13 in use. Typically, the size of the selected object is determined using zoom user-interface such as pulling at least one corner of the displayed image (e.g., the displayed selected object) or a similar operation.

Reference is now made to FIG. 6, which is an illustration of the five frames of FIGS. 4 and 5 as displayed after a zoom operation, according to one exemplary embodiment.

As an option, the illustration of FIG. 6 may be viewed in the context of the details of the previous or following figures. Of course, however, the illustration of FIG. 6 may be viewed in the context of any desired environment. Further, the aforementioned definitions may equally apply to the description below.

FIG. 6 includes five frames (identified by numerals 46, 47, 48, 49, and 50) of a displayed video stream, corresponding to frames 40, 41, 42, 43, and 44 of FIGS. 4 and/or 5. Frames 46, 47, 48, 49 and 50 include a selected object 51.

As shown in FIG. 6, video zooming system 10, and/or video zooming software program 19, may display the selected object 51 while preserving the size of the selected object 51 as determined by the user. For example, frames 46, 47, 48, 49 and 50 include a selected object 51 displayed in the same size.

Additionally, or optionally, video zooming system 10, and/or video zooming software program 19, may display the selected object 51 while preserving the location of the selected object 51 within the screen display. Particularly, as shown in FIG. 6, video zooming system 10 and/or video zooming software program 19 may preserve the location of the selected object 51 by locating the center of the displayed selected object 51 in the center of the screen display (or in the center of the display area, which may be smaller than the display screen).

As shown in FIG. 6, the rest of the screen display may contain video image of the video stream surrounding the selected object.

Reference is now made to FIG. 7, which is an illustration of the five frames including a selected object including plurality of selected recognized objects 39 as displayed after a zoom operation, according to one exemplary embodiment.

As an option, the illustrations of FIG. 7 may be viewed in the context of the details of the previous or following figures. Of course, however, the illustrations of FIG. 7 may be viewed in the context of any desired environment. Further, the aforementioned definitions may equally apply to the description below.

As shown in FIG. 7, the selected object 52 may include a plurality of selected recognized objects 39. The plurality of selected recognized objects 39 may move in various directions therefore their respective size may change, as well as the distance between them. Therefore the shape and/or the area of the selected object may change.

As shown in FIG. 7, video zooming system 10, and/or video zooming software program 19, may preserve the center 53 of the selected object 52 within the center of the screen display (or in the center of the display area, which may be smaller than the display screen).

Additionally, video zooming system 10, and/or video zooming software program 19, may preserve the size of the selected object 52, for example, where at least one dimension of the selected object 52 is confined with respect to an associated at least one dimension of the screen display. For example, preserving the size may be obtained by preserving the distance between the plurality of regions-of-interest. For example, preserving the location of the center of the selected object may be obtained by preserving the location of the averaged center of the plurality of regions-of-interest.

For example, a zoom view of the selected object 52 that requires a display area 54 may be selected that is of a different shape than the shape of the screen display 55, and/or its area is smaller than the area of the screen display. The selected zoom view may also determine a particular ratio between the area of the selected object 52 and the area of the display area 54. Thereafter, as the relation between the recognized objects 39 may change, video zooming system 10, and/or video zooming software program 19, may adapt the shape of the display area 54, for example, by maximizing it. Consequently, video zooming system 10, and/or video zooming software program 19, may adapt the shape of the displayed selected object 52 to preserve the size of the selected object 52, for example, by adapting the area of selected object 52 to the required ratio with reference to the display area 54.

It is appreciated that any type of parameter and any number of parameters associated with the screen display 55, and/or the display area 54, and/or the selected object 52, and/or the plurality of recognized objects 39, may be used to compute and determine how to preserve the selected size of the selected object, as well as preserving the size or distance between said plurality of regions-of-interest.

It is appreciated that any type of parameter and any number of parameters associated with the screen display 55, and/or the display area 54, and/or the selected object 52, and/or the plurality of recognized objects 39, may be used to compute and determine how to preserve location of the center of the selected object, as well as preserving the location of the center of the plurality of regions-of-interest.

Therefore, to preserve the size and/or location of the selected object, the video zooming system 10, and/or video zooming software program 19, may crop the video stream, or image, surrounding the selected object 52 to adapt it to the shape and/or size of the display area 54.

Alternatively, the video zooming system 10, and/or video zooming software program 19, may shrink the video stream, or image, surrounding the selected object 52 to fit to the shape and/or size of the display area 54. Shrinking may change the aspect ratio of the image, for example, so that images located horizontally to the selected object 52 may look thinner than that in reality, and images located vertically to the selected object 52 may look shorter (and/or wider) than that in reality.

Alternatively, the video zooming system 10, and/or video zooming software program 19, may adapt the video stream, or image, surrounding the selected object 52 to fit to the shape and/or size of the display area 54 by converting it non-linearly, as may be seen when using a fisheye lens. Non-linear mode may gradually change the aspect ratio of images in the area surrounding the selected object 52 so that images closer to the selected object 52 are less affected, and images remote from the selected object 52 are affected more.

Video zooming system 10, and/or video zooming software program 19, may therefore divide (or separate) the video stream into two-video streams. A first, or core, video stream 56 including the selected object 52, and a second, or surround, video stream 57 including the area surrounding the selected object 52, are shown in FIG. 3.

Video zooming system 10, and/or video zooming software program 19, may therefore create two or more video streams comprising the image as captured by a camera or any type of imaging device. It is appreciated that there may be a plurality of core video streams and a surround video stream.

It is appreciated that the surround video stream may include only the imaging as captured less the imaging included in the core video streams. Alternatively (or optionally), the surround video stream may include the entire imaging as captured, however, in lower quality than the core video streams. Alternatively (or optionally), the surround video stream may include the imaging as captured less the imaging included in the core video streams, plus any component of the imaging included in the core video stream, for example, in lower quality than the respective core video stream.

The first, or core, video stream, and the second, or surround, video stream, may be included in a single multimedia file such as shown and described with reference to FIG. 3. The core video stream and the surround video stream may be interleaved within the multimedia file with their respective Zoom Information packet 36.

It is appreciated that the video zooming system 10 and/or video zooming software program 19 may display the first, or core, video stream, and the second, or surround, video stream, simultaneously, typically on the same screen display.

Typically, the communication elements (e.g., elements 33 of FIG. 3) of the core video stream may be associated with communication elements of the surround video stream temporally and/or spatially. The association may be provided in a Zoom Information packet 36 communicated with the video elements. In this respect, a single Zoom Information packet 36 may serve a pair of communication elements of both the core and the surround video streams.

It is appreciated that it is advantageous to display the selected object 52 using the highest resolution provided by the screen display. On the other hand, the image surrounding the selected object 52 may be cropped, shrunk, or non-linearly converted, and thus may be displayed in lower resolution than captured. Therefore, the transmitter communication terminal 13 may use different resolution, and/or different compression, for the selected object 52, and for the image surrounding the selected object 52. Particularly, the core video stream (containing the selected object 52) may have relatively high-quality video and the surround video stream (containing the image surrounding the selected object 52) may have relatively low-quality video.

The term 'quality' may refer to any parameter, or combination of parameters, such as resolution level, number of pixels, pixel density, color depth, compression level, method or loss, frame rate, etc.

The surround video stream may contain the entire video stream as captured, communicated in relatively low-quality. The quality of the surround video stream may be adapted according to display parameters and/or network parameters. For example, display parameters may include the area size of the screen display or display area allocated to display the surround video stream. For example, display parameters may include specification of the screen display allocated to display the surround video stream, such as resolution, color depth, aspect ratio, number of pixels, etc. For example, network parameters may include network bandwidth.

It is appreciated that by creating a core video stream (or more) concentrated on the (one or more) object-of-interest, by adapting the shape of the surround video stream to the size and other parameters of the display device, and by adapting, or reducing, the quality of the surround video stream, video zooming system 10, and/or video zooming software program 19, may optimize the usage of the bandwidth of the communication network between a transmitter and a receiver. Such optimization may be created in any part, or leg, of the communication network, or between any transmitter and receiver between the transmitter terminal device and the receiver terminal device.

Therefore, communicating a user selection of a region-of interest from a receiver device to a transmitter device is useful in optimizing the usage of the network bandwidth between the transmitter and the receiver.

Communicating a user selection of a region-of interest from a receiver device to a transmitter device is useful in optimizing the usage of the network bandwidth between the transmitter and the receiver.

Therefore, if a plurality of recipient users are involved, a plurality of regions-of interest may be communicated to a transmitter device upstream, resulting in a plurality of core video streams, and one (or more) surround video streams.

Reference is now made to FIG. 8, which is a simplified illustration of a communication channel including a wearable camera and a portable server, according to one exemplary embodiment.

As an option, the illustration of FIG. 8 may be viewed in the context of the details of the previous or following figures. Of course, however, the illustration of FIG. 8 may be viewed in the context of any desired environment. Further, the aforementioned definitions may equally apply to the description below.

As shown in FIG. 8 the communication channel 58 may include a wearable camera 59, for example in the form of a wristband-mounted camera 60, or a head-mounted camera 61. The wearable camera 59 may be regarded as a transmitter communication terminals 13.

The communication channel 58 may also include a portable server 17, for example in the form of a smartphone or tablet computer 62, or a smartwatch 63 (if, for example, equipped with a SIM card). Smartwatch 63 may also serve as a display device and/or a user-input device for a portable server 17 such as smartphone or tablet computer 62.

As shown in FIG. 8, wearable camera 59 (e.g., wristband-mounted camera 60) may transmit a video stream to portable server 17 (e.g., smartphone 62), which may detect one or more regions-of-interest and send corresponding indicator 45. Portable server 17 (e.g., smartphone 62 may then display the video stream captured by wearable camera 59 on smartwatch 63, along with indicators 45. User 64 may then select one or more objects 39 creating a selected object and communicating the selecting to smartphone 62 (portable server 17).

Portable server 17 (e.g., smartphone 62) may then divide (or separate) the video stream received from wearable camera 59 into two or more video streams according to the selected object as determined by user 64. For example, one pair of video streams (including a core video stream for the selected object and a second video stream for image surrounding the selected object) may be sent to smartwatch 63, and another pair of video stream may be transmitted to a recipient communication device 65.

Optionally, or alternatively, a server 12 may further adapt the core and/or surround video streams to the size and/or resolution specifications of the recipient communication device 65. Server 12 may further analyze the video streams, display indicator 45 on the recipient communication device 65, receive a selected object from recipient communication device 65, and communicate to recipient communication device 65 a different pair of video streams adapted to the selected object as determined by the user of recipient communication device 65.

Modern cameras may have many more pixels than a portable display such as a display of a smartphone or a smartwatch. Therefore, a camera may use a non-linear lens such as a fisheye lens to capture a wide-angle image. The camera, or a transmitter communication terminal 13 associated with the camera, or a portable server 17 associated with the camera, or a server 12 may then determine one or more regions-of-interest and display respective indicators 45 to a user.

The camera, or any of the other entitles listed above, may then receive from the user a selection of regions-of-interest or indicators 45 and create a selected object. The camera (or any of the other entitles listed above) may then linearize the non-linear image of the selected object (e.g., convert into linear mode). The resolution of the selected object in linear mode is expected to match or exceed the resolution of the display device (in spite of the non-linear captured image).

The image surrounding the selected object may be displayed in non-linear mode too, or can be converted into linear mode as well, and then cropped to fit into the screen display.

The compression type, and/or parameter, and/or function, and/or algorithm, of the linear, and/or the non-linear, spatial compression may be communicated from the transmitter, or any other entity providing compression, to the receiver, or any other entity providing decompression. The recipient entity may then use the compression type, and/or parameter, and/or function, and/or algorithm, to provide decompression.

For example, the compression type, parameter, function, and/or algorithm may be communicated within, or as part of, a Zoom Information element 36 of a streaming multimedia file 32. It is appreciated that such particular compression type, parameter, function, and/or algorithm may be associated with one or more particular content elements 33.

It is appreciated that such particular compression type, parameter, function, and/or algorithm may change along a particular streaming multimedia file 32. It is appreciated that such a compression and its related data (compression type, parameter, function, and/or algorithm) provided in the associated Zoom Information element 36 may be added, changed, removed, etc., by any server and/or transmitter along the communication channel between the original transmitter to a particular recipient.

It is appreciated that the camera resolution may vary considerably and display resolution may vary too. Camera aspect ratio also varies and display aspect ratio varies too. It is appreciated that the variety is expected to continue to grow, causing enhanced incompatibility between the camera and the display, particularly with wearable cameras and portable display devices. It is therefore advantageous to communicate image information, and particularly video streams, that are easily adaptable to the characteristics of the display device, to make the best use of the display area, to provide high quality image, and yet to adapt to the available communication bandwidth of the intermediating communication network.

Using the facilities of the video zooming system 10 as shown and described herein, a camera, or a transmitter communication terminal 13, or a portable server 17 or an intermediating server 12, may divide (or separate) a captured video stream into two or more video streams. A core type of video streams may concentrate, each one (or more) recognized object (such object 39), and surround type video streams may contain the image surrounding the recognized objects. The plurality of video streams may be communicated as an interleaved multimedia stream, or file, as shown and described with reference to FIG. 3, typically including respective Zoom Information packet 36.

Typically, the video streams of the core type may be communicated in relatively high quality, and the video stream of the surround type may be communicated in relatively low quality, for example, to save network bandwidth. For example, the video stream of the surround type may be communicated in non-linear mode. The video stream of the surround type may contain the entire video stream as captured, communicated in relatively low-quality and/or in non-linear mode, adaptive to the available network bandwidth.

Consequently, a recipient communication terminal 13, or a recipient portable server 17, or an intermediating server 12, may create and/or display to a user one or more indicators 45, and receive user selection of one or more indicators 45.

Thereafter, the recipient communication terminal 13, or the recipient portable server 17, or the intermediating server 12, may assemble a first (displayable) video stream including content of first (core) type video stream per the indicators 45 selected by the user, and a second (displayable) video stream including content from the second (surround) type video stream as well as content of non-selected first (core) type video streams (surrounding the user-selected indicators 45).

The recipient portable server 17, or the intermediating server 12, may communicate the first and second (displayable) video streams to the recipient communication terminal 13 as an interleaved multimedia stream or file.

Thereafter, the recipient communication terminal 13, or the recipient portable server 17, or the intermediating server 12, may assemble a display content, to be displayed on a particular, screen display where the second (displayable) video stream is adapted to the characteristics (such as size, number of pixels, and resolution) of the particular screen display.

Reference is now made to FIG. 9A, which is a simplified illustration of linear-mode display, and to FIG. 9B, which is a simplified illustration ofa non-linear-mode display, of the scenery of image 41 of FIG. 5, according to one exemplary embodiment.

As an option, the illustrations of FIGS. 9A and 9B may be viewed in the context of the details of the previous figures. Of course, however, the illustrations of FIGS. 9A and 9B may be viewed in the context of any desired environment. Further, the aforementioned definitions may equally apply to the description below.

The second (displayable) video stream may include linear-mode imaging, and may be cropped to fit the size of the particular screen display. For example of a linear mode compression.

FIG. 9A shows the scenery of image 41 of FIG. 5 linearly compressed horizontally. The center part (core image) of the image of FIG. 9A may be in zoom-in mode (enlarged) while the surrounding parts (on both sides of the core image) may be spatially compressed horizontally, in a linear manner. As disclosed above, the core image part and the surrounding mage part may be communicated as two interleaved streams.

In a linear manner the compression is constant throughout the surrounding part of the image. As disclosed above, the core image part and the surrounding mage part may be communicated as two interleaved streams.

It is appreciated that the linear horizontal compression of FIG. 9A is provided as a simple visual example, and that spatial compression similar to the linear horizontal compression may be implemented in various, and/or all, directions and manners.

FIG. 9B shows the scenery of image 41 of FIG. 5 non-linearly compressed horizontally. The center part (core image) of the image of FIG. 9B may be in zoom-in mode (enlarged) while the surrounding parts (on both sides of the core image) may be spatially compressed horizontally, in a non-linear manner.

In a non-linear manner the compression may increase with the distance from the core image. As disclosed above, the core image part and the surrounding mage part may be communicated as two interleaved streams.

It is appreciated that the non-linear horizontal compression of FIG. 9B is provided as a simple visual example, and that spatial compression similar to the non-linear horizontal compression may be implemented in various, and/or all, directions and manners.

Alternatively, the second (displayable) video stream may include and display non-linear-mode imaging, adapted to fit the size of the particular screen display.

The second (displayable) video stream may include non-linear-mode imaging, and may be converted to linear-mode, and then cropped to fit the size of the particular screen display.

The second (displayable) video stream may include linear-mode imaging, and may be converted to non-linear-mode to fit the size of the particular screen display.

It is appreciated that non-linear display of the area surrounding the selected object may have different non-linearity (or compression) in different directions. For example, a user panning left from the center of the original image as captured may cause increase of the compression of the image displayed to the right of the selected object, while the compression of the image displayed to the left of the selected object may decrease.

Alternatively, the recipient communication terminal 13, or the recipient portable server 17, or the intermediating server 12, may automatically assume that a user has selected the central part of the video image as a region-of-interest and create a displayable image including two parts. The central part being displayed in linear-mode, typically preserving the original aspect ratio of the camera. The second part including the rest of the display displayed in non-linear-mode. The non-linear mode typically compresses the image (spatially and/or radially) where the compression increases with the distance from the center of the display. The edges of the second part are typically compressed to fit the rest of the screen display area.

If the user watching the image pans or scrolls through the image, the part of the image located in the center of the display, or in the direction of the panning/scrolling is presented undistorted (e.g., in linear-mode).

It is appreciated that video zooming system 10 and/or zooming software 15 and/or 16 may enable object-oriented zoom split over a communication network. For example, a recipient user, and/or a recipient terminal, may indicate to (or direct, or instruct) a transmitting terminal, and/or a camera capturing an image, to split the image into one or more regions-of-interest, and a surrounding image (as described above).

It is appreciated that video zooming system 10 and/or zooming software 15 and/or 16 may enable object-oriented zoom split communication over a network. For example, a transmitting terminal, and/or a camera capturing an image, may communicate each of the regions-of-interest as an independent video (content, medium) stream (e.g., core streams), and the surrounding image as another, independent, video (content, medium) stream. In this manner the original image, or video stream, as captured, is split spatially into two (or more) independent images, or video streams.

Additionally, and/or optionally, the two or more video streams are communicated in an interleaved manner in a unified file, where the stream elements of the different streams are associated temporally and/or spatially. The video zooming system 10 and/or zooming software 15 and/or 16 may communicate a streaming multimedia file 32 including a plurality of interleaved content streams, where some of the content streams (e.g., core streams), each carry one region-of-interest, and another content stream carry a surrounding image, or video, (as described above). Stream elements of the various interleaved streams are at least temporally and/or spatially associated and/or synchronized.

It is appreciated that video zooming system 10 and/or zooming software 15 and/or 16 may use the image split into one or more regions-of-interest, and surrounding image to make better use of the available bandwidth by allocating higher bandwidth (more bits-per-second) to the (core) stream(s) carrying the region(s)-of-interest, and compensate the bandwidth by allocating lower bandwidth (less bits-per-second) to the stream carrying the surrounding image.

In that sense, both the split zoom (the recipient directing the transmitter) and the split communication (two independent streams, communicated in an interleaved manner, with spatial and/or temporal associated communication elements) may be used to provide increased bandwidth efficiency.

It is appreciated that video zooming system 10 and/or zooming software 15 and/or 16 may use the image split into one or more regions-of-interest, and a surrounding image, to make better use of the available bandwidth. For example, this may be done by using loss-less (or reduced loss) compression for the region(s)-of-interest, and compensating the bandwidth by using lossy, or increased, compression for the surrounding image.

In that sense, both the split zoom (the recipient directing the transmitter) and the split communication (two or more independent streams, communicated in an interleaved manner, with spatial and/or temporal associated communication elements) may be used to provide increased perceived image quality, for example by using different compression techniques (e.g., lossy and loss-less).

It is appreciated that video zooming system 10 and/or zooming software 15 and/or 16 may use the image split into one or more regions-of-interest, and a surrounding image, to make better use of the available camera parameters such as resolution, color depth, etc. For example, this may be done by allocating more pixels to the region(s)-of-interest, and compensating the bandwidth by allocating less pixels to the surrounding image. Further, this may be done by allocating higher color depth to the region(s)-of-interest, and compensating the bandwidth by allocating lower color depth to the surrounding image.

In that sense, both the split zoom (the recipient directing the transmitter) and the split communication (two independent streams, communicated in an interleaved manner, with spatial and/or temporal associated communication elements) may be used to provide increased perceived image quality, for example by using different camera parameters such as resolution, color depth, etc.

It is appreciated that video zooming system 10 and/or zooming software 15 and/or 16 may use the image split into one or more regions-of-interest, and a surrounding image, to make better use of the available bandwidth. For example, this may be done by adapting the surrounding image, or the stream carrying the surrounding image, to the parameters of the recipient terminal, and particularly to the parameters of the recipient screen display of the recipient terminal. Further, this may be done by reducing the size of the image, or resolution, or color depth, according to the capabilities of the recipient screen display.

It is appreciated that video zooming system 10 and/or zooming software 15 and/or 16 may further use non-linear conversion of the captured video stream. For example, this may be done by spatially compressing peripheral area (remote from the region-of-interest) more than area closely surrounding the region-of-interest (e.g., like fisheye). Thus, for example, this may result in reducing bandwidth requirements.

It is appreciated that video zooming system 10 and/or zooming software 15 and/or 16 may communicate the linear mode video part (e.g., the region-of-interest) as a first (core) video stream, and the non-linear mode video part as a second video stream. For example, stream elements of the various interleaved streams may be at least temporally and/or spatially associated and/or synchronized.

It is appreciated that video zooming system 10 and/or zooming software 15 and/or 16 may use at least one communication element to provide the association between communication elements of different streams contained by a single interleaved multimedia file.

Although descriptions have been provided above in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. It is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk. C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a software module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant clients, target services, protocols, communication networks, messages and tickets will be developed and the scope of the term client, target service, protocol, communication network, message and ticket is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is-intended to embrace all such alternatives, modifications and variations that fall within the spirit and broad scope of the appended claims.

What is claimed is:

1. A computer-implemented method for object-oriented-zoom, the method comprising:
    receiving, from a transmitter, a captured video stream and an identification of at least one region-of-interest in said captured video stream;
    marking said at least one region-of-interest on a display of said captured video stream;
    receiving, from a user, a selection of said marked at least one region-of-interest, wherein said selection forms a selected object;
    communicating said selection to said transmitter;
    receiving, from said transmitter, a divided version of said captured video stream, said divided version of said captured video stream including a first part comprising a first video stream and said selected object, and a second part comprising a second video stream and at least a part of said captured video stream but not including said first part, wherein:
        the first part and second part are synchronized at least temporally or spatially; and
        the divided version of said captured video stream is received as an interleaved multimedia stream comprising the first video stream comprising a plurality of first communication elements, and the second video stream comprising a plurality of second communication elements; and
    displaying at least a portion of said first part and at least a portion of said second part simultaneously, wherein the at least the portion of said first part is displayed within the at least the portion of said second part, wherein at least one of the following applies:
        said interleaved multimedia stream comprises an interleaved sequence of said first and second communication elements;
        at least one first communication element is associated with at least one second communication element, at least one of temporally or spatially; or
        said interleaved multimedia stream additionally comprises at least one communication element providing an association between said at least one first communication element and said at least one second communication element.

2. The method according to claim 1, additionally comprising at least one of:
    performing:
        receiving a size selection of said selected object; and
        displaying said selected object while performing at least one of:
            preserving said selected size of said selected object; or
            preserving at least one of a center location and a location of center of said selected object on said display; or
    providing said selected object comprising a plurality of regions-of-interest, and at least one of:
        preserving said selected size of said selected object comprising preserving said size between said plurality of regions-of-interest; or
        preserving at least one of said center location and said location of center of said selected object comprises preserving said location of center of said plurality of regions-of-interest.

3. The method according to claim 1, additionally comprising at least one of:
    performing at least one of:
        cropping said first part to fit a display screen;
        shrinking said first part to fit said display screen; or
        converting said first part into a non-linear mode to fit said display screen;
    providing said first part comprising relatively high-quality video and said second part comprising relatively low-quality video; or
    adapting said relatively low-quality video of said second part to at least one of:
        an area of said display allocated to display said second part;
        a display parameter of said display allocated to display said second part; or
        a communication parameter of a network communicatively coupling said transmitter and a communication device comprising said display screen.

4. The method according to claim 3, additionally comprising at least one of:
    adapting said relatively high-quality video and relatively low-quality video based on at least one of:
        bandwidth allocated to said first part;
        bandwidth allocated to said second part;
        compression allocated to said second part;
        compression allocated to said first part;
        lossy compression allocated to said second part;
        loss-less compression allocated to said first part;
        resolution allocated to said first part;
        resolution allocated to said second part;
        color depth allocated to said first part; or
        color depth allocated to said second part;

converting said second part into a non-linear mode; or
converting said first part into a linear mode.

5. The method according to claim 1, further comprising creating said first part and said second part by at least one of:
creating at least one of said first or second parts by an imaging device capturing said captured video stream;
creating at least one of said first or second parts by said transmitter; creating at least one of said first or second parts by a recipient communication terminal;
creating at least one of said first or second parts by a network server; or
creating at least one of said first or second parts in an intermediary location in a communication network connecting said transmitter and said recipient communication terminal.

6. A transmitter of object-oriented-zoom, the transmitter comprising a hardware-based processor executing software program instructions to perform operations comprising:
identifying at least one region-of-interest in a captured video stream;
communicating to a receiver said captured video stream and an identification of said at least one region-of-interest;
receiving from said receiver a user selection of said at least one region-of-interest, wherein said user selection forms a selected object;
dividing said captured video stream into a first part comprising a first video stream and said selected object and a second part comprising a second video stream and at least a part of said captured video stream but not including said first part, wherein:
the first part and second part are synchronized at least temporally or spatially; and
the divided captured video stream is received as an interleaved multimedia stream comprising the first video stream comprising a plurality of first communication elements, and the second video stream comprising a plurality of second communication elements; and
communicating at least a portion of said first part and at least a portion of said second part to said receiver for display, wherein the at least the portion of the first part is configured to display within the at least the portion of the second part, wherein at least one of the following applies:
said interleaved multimedia stream comprises an interleaved sequence of said first and second communication elements;
at least one first communication element is associated with at least one second communication element, at least one of temporally or spatially; or
said interleaved multimedia stream additionally comprises at least one communication element providing an association between said at least one first communication element and said at least one second communication element.

7. The transmitter according to claim 6, additionally comprising software program instructions to perform operations comprising at least one of:
providing said second part as at least one of:
cropped to fit a display screen;
shrunk to fit said display screen; or
converted into a non-linear mode to fit said display screen;
providing said first part comprising relatively high-quality video and said second part comprising relatively low-quality video; or
adapting said relatively low-quality video of said second part to at least one of:
an area size of said display allocated to display said second part;
a display parameter of said display allocated to display said second part; or
a communication parameter of a network communicatively coupling said transmitter and a communication device comprising said display screen.

8. The transmitter according to claim 7, additionally comprising software program instructions to perform operations comprising at least one of:
adapting said relatively high-quality video and relatively low-quality video based on at least one of:
bandwidth allocated to said first part;
bandwidth allocated to said second part;
compression allocated to said second part;
compression allocated to said first part;
lossy compression allocated to said second part;
loss-less compression allocated to said first part;
resolution allocated to said first part;
resolution allocated to said second part;
color depth allocated to said first part; or
color depth allocated to said second part;
converting said second part into a non-linear mode to fit to said display screen of said receiver; or
converting said first part into a linear mode to fit to said display screen of said receiver.

9. A receiver of object-oriented-zoom, the receiver comprising a hardware-based processor executing software program instructions to perform operations comprising:
receiving from a transmitter a captured video stream and an identification of at least one region-of-interest in said captured video stream;
marking said at least one region-of-interest on a display of said captured video stream;
receiving from a user a selection of said at least one region-of-interest, wherein said selection forms a selected object;
communicating said selection to said transmitter;
receiving from said transmitter a first part comprising a first video stream and said selected object, and a second part comprising a second video stream and at least part of said captured video stream but not including said first part, wherein:
the first part and second part are synchronized at least temporally or spatially; and
the first and second parts are received as an interleaved multimedia stream comprising the first video stream comprising a plurality of first communication elements, and the second video stream comprising a plurality of second communication elements; and
displaying at least a portion of said first part and at least a portion of said second part simultaneously, wherein the at least the portion of said first part is displayed within the at least the portion of said second part, wherein at least one of the following applies:
said interleaved multimedia stream comprises an interleaved sequence of said first and second communication elements;
at least one first communication element is associated with at least one second communication element, at least one of temporally or spatially; or
said interleaved multimedia stream additionally comprises at least one communication element providing an association between said at least one first communication element and said at least one second communication element.

10. The receiver according to claim 9, additionally comprising software program instructions for performing at least one of:
receiving a size selection of said selected object; or
displaying said selected object while performing at least one of:
preserving said selected size of said selected object; or
preserving at least one of a center location or a location of center of said selected object on said display; or
providing said selected object comprising a plurality of regions-of-interest; and
wherein said processor executing said software program instructions additionally performs at least one of:
preserving a size between said plurality of regions-of-interest; or
preserving at least one of center locations and locations of center of said plurality of regions-of-interest.

11. The receiver according to claim 9, additionally comprising software program instructions for at least one of:
receiving said first part comprising relatively high-quality video and said second part comprising relatively low-quality video;
wherein said relatively high-quality video and relatively low-quality video are based on at least one of:
bandwidth allocated to said first part;
bandwidth allocated to said second part;
compression allocated to said second part;
compression allocated to said first part;
lossy compression allocated to said second part;
loss-less compression allocated to said first part;
resolution allocated to said first part;
resolution allocated to said second part;
color depth allocated to said first part; or
color depth allocated to said second part;
converting said second part from a non-linear mode; or
converting said first part from a linear mode.

12. A computer program product embodied on a non-transitory computer readable medium comprising computer code for:
identifying, by a transmitter, at least one region-of-interest in a captured video stream;
communicating to a receiver said captured video stream and an identification of said at least one region-of-interest;
receiving a selection of said at least one region-of-interest, wherein said selection forms a selected object;
dividing said captured video stream, by said transmitter, into a first part comprising a first video stream and said selected object, and a second part comprising a second video stream and at least a part of said captured video stream but not including said first part, wherein:
the first part and second part are synchronized at least temporally or spatially;
the divided captured video stream is received as an interleaved multimedia stream comprising the first video stream comprising a plurality of first communication elements, and the second video stream comprising a plurality of second communication elements; and
communicating said first part and said second part to said receiver; and
enabling display of at least a portion of said first part and at least a portion of said second part simultaneously, wherein the at least the portion of said first part is configured to display within the at least the portion of said second part, wherein at least one of the following applies:
said interleaved multimedia stream comprises an interleaved sequence of said first and second communication elements;
at least one first communication element is associated with at least one second communication element, at least one of temporally or spatially; or
said interleaved multimedia stream additionally comprises at least one communication element providing an association between said at least one first communication element and said at least one second communication element.

13. The computer program product according to claim 12, wherein at least one of:
said first part comprises a first video stream and said second part comprises a second video stream;
said computer code is additionally configured for receiving an interleaved multimedia stream comprising:
said first stream comprising a plurality of first communication elements, and
said second stream comprising a plurality of second communication elements;
wherein said interleaved multimedia stream comprises an interleaved sequence of said first and second communication elements; or
wherein at least one first communication element is associated with at least one second communication element, at least one of temporally or spatially; or said interleaved multimedia stream additionally comprises at least one communication element providing said association between said at least one first communication element and said at least one second communication element.

14. The computer program product according to claim 12, additionally comprising computer code for at least one of:
receiving a size selection of said selected object;
displaying said selected object while performing at least one of:
preserving said selected size of said selected object; or
preserving at least one of a center location or a location of center of said selected object on said display;
receiving a plurality of regions-of-interest;
preserving said selected size of said selected object by preserving said size between said plurality of regions-of-interest; or
preserving at least one of said center location and said location of center of said selected object by preserving said location of center of said plurality of regions-of-interest.

15. The computer program product according to claim 12, additionally comprising at least one of:
computer code for:
cropping said first part to fit a display screen;
shrinking said first part to fit said display screen; or
converting said first part into a non-linear mode to fit said display screen;
wherein said first part comprises relatively high-quality video and said second part comprises relatively low-quality video; or
wherein said relatively low-quality video of said second part is adapted to at least one of:
an area size of said display allocated to display said second part;
a display parameter of said display allocated to display said second part; or a parameter of a network communicatively coupling said transmitter and a communication device comprising said display screen.

16. The computer program product according to claim 12, additionally comprising at least one of:
wherein said relatively high-quality video and relatively low-quality video are based on at least one of:
bandwidth allocated to said first part;
bandwidth allocated to said second part;
compression allocated to said second part;
compression allocated to said first part;
lossy compression allocated to said second part;
loss-less compression allocated to said first part;
resolution allocated to said first part;
resolution allocated to said second part;
color depth allocated to said first part; or
color depth allocated to said second part;
converting said second part into a non-linear mode; or
converting said first part into a linear mode.

17. The computer program product according to claim 12, wherein said first part and said second part are created by at least one of:
creating at least one of said first or second parts by a processor of an imaging device capturing said captured video stream;
creating at least one of said first or second parts by a processor of said transmitter;
creating at least one of said first or second parts by a processor of a recipient communication terminal;
creating at least one of said first or second parts by a processor of a network server; or
creating at least one of said first or second parts by a processor of an intermediary location in a communication network connecting said transmitter and said recipient communication terminal.

* * * * *